United States Patent
Kanbayashi

(10) Patent No.: US 10,625,182 B2
(45) Date of Patent: Apr. 21, 2020

(54) SUSPENSION FLOW-THROUGH SEPARATION APPARATUS, SYSTEM AND METHOD

(71) Applicant: Hitachi, Ltd., Chiyoda-ku, Tokyo (JP)

(72) Inventor: Takuya Kanbayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 15/747,369

(22) PCT Filed: Jun. 14, 2016

(86) PCT No.: PCT/JP2016/067651
§ 371 (c)(1),
(2) Date: Jan. 24, 2018

(87) PCT Pub. No.: WO2017/216864
PCT Pub. Date: Dec. 21, 2017

(65) Prior Publication Data
US 2018/0214795 A1 Aug. 2, 2018

(51) Int. Cl.
| | |
|---|---|
| *B01D 21/28* | (2006.01) |
| *B01D 21/24* | (2006.01) |
| *B01D 21/00* | (2006.01) |
| *B01D 21/34* | (2006.01) |
| *B01J 19/10* | (2006.01) |
| *B01J 19/24* | (2006.01) |
(Continued)

(52) U.S. Cl.
CPC ......... *B01D 21/283* (2013.01); *B01D 21/003* (2013.01); *B01D 21/2444* (2013.01);
(Continued)

(58) Field of Classification Search
CPC .. B01D 21/003; B01D 21/24; B01D 21/2444; B01D 21/28; B01D 21/283; B01D 21/30;
(Continued)

(56) References Cited

U.S. PATENT DOCUMENTS

| | | | |
|---|---|---|---|
| 5,085,783 A | 2/1992 | Feke et al. | |
| 5,164,094 A | 11/1992 | Stuckart | |

(Continued)

FOREIGN PATENT DOCUMENTS

| | | |
|---|---|---|
| DE | 38 25 319 A1 | 2/1990 |
| JP | 2-503528 A | 10/1990 |

(Continued)

OTHER PUBLICATIONS

International Search Report (PCT/ISA/210) issued in PCT Application No. PCT/JP2016/067651 dated Jul. 19, 2016 with English translation (7 pages).

(Continued)

*Primary Examiner* — Natasha E Young
(74) *Attorney, Agent, or Firm* — Crowell & Moring LLP

(57) ABSTRACT

A suspension flow-through separation apparatus includes a flow-through separator including a flow-through separation unit. The flow-through separation unit includes a cavity structure that functions as a channel through which a suspension flows, a side surface portion which extends in an x-direction of the cavity structure, a supply port which is provided at one side surface portion, an outlet port which is provided at the other side surface portion, two planar portions that extend in a y-direction in the cavity structure and face to each other, and an ultrasonic oscillator that is provided at least one of two planar portions, and emits ultrasonic waves to the channel. The suspended matter in the suspension is captured by the ultrasonic waves and separated in a z-direction that is a vertical direction while the suspension flows through the channel of the flow-through separator.

14 Claims, 16 Drawing Sheets

(51) Int. Cl.
*C02F 1/36* (2006.01)

(52) U.S. Cl.
CPC ............... *B01D 21/34* (2013.01); *B01J 19/10* (2013.01); *B01J 19/245* (2013.01); *C02F 1/36* (2013.01); *B01J 2219/089* (2013.01); *B01J 2219/1923* (2013.01); *C02F 2209/005* (2013.01); *C02F 2209/11* (2013.01); *C02F 2209/40* (2013.01)

(58) Field of Classification Search
CPC . B01D 21/34; B01J 19/00; B01J 19/08; B01J 19/10; B01J 19/24; B01J 19/245; B01J 2219/08; B01J 2219/0873; B01J 2219/0881; B01J 2219/089; B01J 2219/19; B01J 2219/192; B01J 2219/1923; C02F 1/36; C02F 2209/005; C02F 2209/11; C02F 2209/40
See application file for complete search history.

(56) References Cited

U.S. PATENT DOCUMENTS

| | | |
|---|---|---|
| 9,375,662 B2 | 6/2016 | Kambayashi et al. |
| 2015/0209696 A1 | 7/2015 | Kambayashi et al. |
| 2016/0194219 A1 | 7/2016 | Kambayashi et al. |

FOREIGN PATENT DOCUMENTS

| | | |
|---|---|---|
| JP | 2004-24959 A | 1/2004 |
| JP | 2014-79748 A | 5/2014 |
| JP | 2015-100719 A | 6/2015 |
| WO | WO 2012/017976 A1 | 2/2012 |
| WO | WO 2013/043044 A1 | 3/2013 |
| WO | WO 2014/050320 A1 | 4/2014 |
| WO | WO 2015/025395 A1 | 2/2015 |

OTHER PUBLICATIONS

Japanese-language Written Opinion (PCT/ISA/237) issued in PCT Application No. PCT/JP2016/067651 dated Jul. 19, 2016 (3 pages).

SUSPENSION FLOW-THROUGH SEPARATION APPARATUS, SYSTEM AND METHOD

CROSS REFERENCE TO RELATED APPLICATIONS

This application is a U.S. National Stage Application of International Application No. PCT/JP2016/067651, filed Jun. 14, 2016, the disclosures of which are expressly incorporated by reference herein.

TECHNICAL FIELD

The present invention relates to a suspension processing technology. In addition, the present invention relates to a technology for separating a suspended matter in a suspension.

BACKGROUND ART

A mechanism capable of efficiently separating and removing a suspended matter in a suspension in various applications such as factory wastewater processing facilities is required. The suspended matter is a substance such as a solid component or a droplet which is opacified in a state of being dispersed in a liquid, and indicates an object to be separated.

As a method for separating a suspended matter in a suspension in a conventional example, there is a method for separating the suspended matter from the suspension by emitting ultrasonic waves to the suspension.

A prior art example relating to the method for separating a suspended matter in a suspension includes JP-A-2014-79748 (PTL 1). PTL 1 describes the following as a suspension processing apparatus using ultrasonic waves. The processing apparatus includes a supply port for supplying a suspension into the apparatus, a channel portion through which the suspension flows, an outlet port for discharging processed suspension, an oscillator for emitting ultrasonic waves, and a reflection plate for reflecting the emitted ultrasonic waves.

CITATION LIST

Patent Literature

PTL 1: JP-A-2014-79748

SUMMARY OF INVENTION

Technical Problem

PTL 1 describes a method for separating a suspended matter in a suspension of a conventional example, for example, describes that in a suspension processing apparatus of PTL 1, by adopting an apparatus configuration set in consideration of a flowing direction of the suspension and a propagation direction of ultrasonic waves, high suspended matter separation ability is obtained without increasing a size of an oscillator.

In the processing apparatus of PTL 1, the ultrasonic waves are emitted to a liquid in a channel portion sandwiched between the oscillator and the reflection plate. In this manner, the ultrasonic waves emitted from the oscillator are reflected by the reflection plate, and thus a standing wave is formed in the channel portion. When a node that is a region with high sound pressure and an antinode that is a region with a low sound pressure cyclically appear along the channel portion, in a case where there is suspended matters which are sufficiently small in comparison with intervals between the antinode and the node in the channel portion, the suspended matters are captured at the position of the antinode or the node. These suspended matters are aggregated to each other, and a settling velocity or a floating velocity of the aggregate increases depending on physical properties or the like of the aggregate. In a case where the settling velocity increases, the aggregate settles down to a bottom portion of the channel portion in a vertical direction, and condensed. In a case where the floating velocity increases, the aggregate floats on an upper portion of the channel portion in the vertical direction and condensed.

By increasing the length of the channel portion of the processing apparatus and increasing the number of the antinodes and the nodes of the standing waves, it is expected that the separation ability of the suspended matter can be enhanced. The separation ability can be measured and evaluated quantitatively by turbidity or the like. For example, a part of the ultrasonic wave is absorbed by a liquid such as water which is a medium of the suspension. Therefore, when increasing the length of the channel portion longer than a certain distance, it is difficult to form the standing wave. That is, in order to form the standing wave capable of capturing the suspended matter in the channel portion, it is necessary to limit the maximum length of a cavity structure which configures the channel portion in an ultrasonic wave propagation direction to a certain distance or less.

As described above, in the method for separating a suspended matter in a suspension, the processing apparatus, or the like of the prior art example, there is a problem in terms of the separation ability of the suspended matter.

Relating to a technology for separating a suspended matter in a suspension using ultrasonic waves, an object of the present invention is to provide a technology that can realize high separation ability capable of highly efficient separation of the suspended matter in the suspension.

Solution to Problem

A representative embodiment in the present invention is a suspension flow-through separation apparatus or the like, and the following configurations are used.

A suspension flow-through separation apparatus for separating a suspended matter in a suspension while flowing through the suspension of one embodiment, the apparatus includes a flow-through separator that is configured by connecting a plurality of the flow-through separation units, in which the flow-through separation unit includes a cavity structure that functions as a channel through which the suspension flows, a side surface portion which extends in a first direction of the cavity structure in a horizontal direction, a supply port which is provided at one first side surface portion of the side surface portion, and through which the suspension is supplied, an outlet port which is provided at the other second side surface portion of the side surface portion, and through which the suspension is discharged, a first planar portion and a second planar portion that are two planar portions extending in a second direction orthogonal to the first direction of the cavity structure in the horizontal direction, and facing each other, and an ultrasonic oscillator that is provided at least one of the first planar portion and the second planar portion, and emits ultrasonic waves to the channel based on a driving signal, in which the suspended matter in the suspension is captured by the ultrasonic waves and separated in a vertical direction while the suspension flows through the channel of the flow-through separator, and in which a first angle formed by the first direction or the second direction and a flow-through direction corresponding to a straight line connecting a center point of the supply port and a center point of the outlet port is an acute angle.

Advantageous Effects of Invention

According to the representative embodiment in the present invention, relating to a technology for separating a suspended matter in a suspension using ultrasonic waves, high separation ability capable of highly efficient separation of the suspended matter in the suspension can be realized.

DESCRIPTION OF EMBODIMENTS

Hereinafter, embodiments of the present invention will be described in detail based on drawings. Note that components having the same function are denoted by the same reference symbols throughout the drawings for describing the embodiment, and the repetitive description thereof will be omitted.

Embodiment 1

A suspension flow-through separation apparatus, a system, and a method of Embodiment 1 of the present invention will be described with reference to FIGS. 1 to 13. The suspension flow-through separation apparatus or the like of Embodiment 1 has a configuration suitable for use for flowing through a suspension such as industrial waste water, and for performing suspension processing or water purification processing for separate a suspended matter from the suspension. In a flow-through separation step of performing flow-through and separation, the suspension flow-through separation apparatus and the method of Embodiment 1 separates the suspension into a concentrated liquid where the suspended matter is concentrated and a clear liquid containing little other suspended matters. The clear liquid after separation is a liquid in which the number of suspended matters in the liquid per volume is smaller than that of the original suspension supplied to the suspension flow-through separation apparatus. In addition, the concentrated liquid after separation is a liquid in which the number of suspended matters per volume is greater than that of the original suspension supplied to the suspension flow-through separation apparatus.

(Suspension Flow-Through Separation System)

Figure 1:
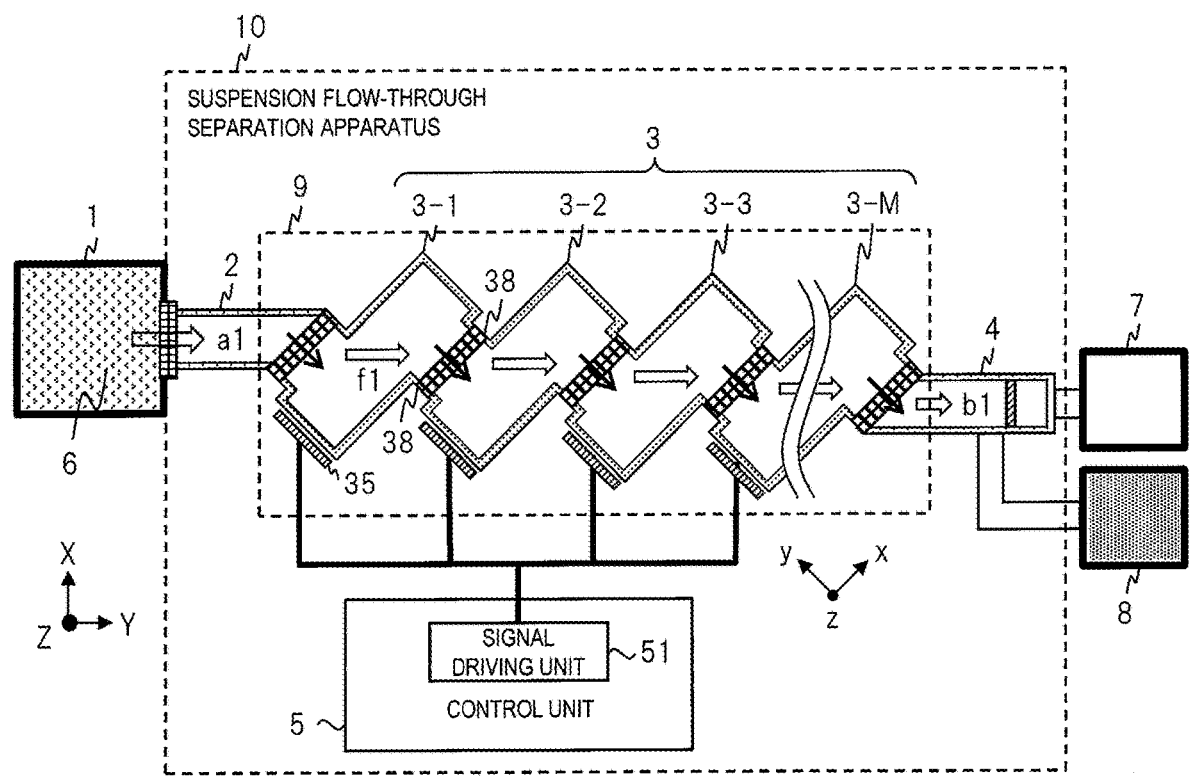
FIG. 1 is a diagram illustrating a configuration of a suspension flow-through separation system including a suspension flow-through separation apparatus of Embodiment 1 of the present invention on a XY plane.

FIG. 1 illustrates a configuration of a suspension flow-through separation system including a suspension flow-through separation apparatus 10 of Embodiment 1 of the present invention on a xy plane. The suspension flow-through separation system of FIG. 1 includes a flow-through tank 1, a suspension flow-through separation apparatus 10, a clear liquid discharging unit 7, and a concentrated liquid discharging unit 8, and these are connected to each other. The suspension flow-through separation apparatus 10 is connected to a latter stage of the flow-through tank 1, and the clear liquid discharging unit 7 and the concentrated liquid discharging unit 8 are connected in parallel to a latter stage of the suspension flow-through separation apparatus 10.

The suspension flow-through separation apparatus 10 is an apparatus that performs processing of separation a suspended matter in a suspension 6 while flowing through the suspension 6. The suspension flow-through separation apparatus 10 is configured by connecting a plurality of types of units. The suspension flow-through separation apparatus 10 includes a liquid supplying unit 2, a flow-through separatorseparator 9, a control unit 5, and a discharging unit 4, and these are connected to each other. The flow-through separatorseparator 9 includes a plurality of flow-through separation units 3 connected to each other. The number of the flow-through separation units 3 is defined as M, and the number M is 2 or more. The plurality of flow-through separation units 3 includes a flow-through separation unit 3-1, a flow-through separation unit 3-2, . . . , and a flow-through separation unit 3-M, in order from the supplying side.

In FIG. 1, as a direction and a coordinate system in the description, (X, Y, Z) and (x, y, z) are illustrated. The X direction and the Y direction are two orthogonal directions constituting the horizontal direction and the horizontal plane, and the Z direction is the vertical direction. In FIG. 1, the entire system is shown in the XY plane constituted by the X direction and the Y direction.

In addition, the x and y directions indicated by (x, y, z) in the direction and coordinate system as viewed from one flow-through separation unit 3 are two orthogonal directions constituting the horizontal direction and the horizontal plane, the z direction is the vertical direction.

The flow-through tank 1 is a suspension accumulating portion in which the suspension 6 is stored. The flow-through tank 1 and the liquid supplying unit 2 are connected to each other through the connecting portion. The connecting portion includes a valve that can be opened and closed. By setting the valve of the connecting portion to an open state, the suspension 6 in the flow-through tank 1 flows into the liquid supplying unit 2. A configuration in which the suspension 6 is introduced in the flow-through tank 1 from the Z direction and flows into the liquid supplying unit 2 without providing the connecting portion may be adopted. The flow-through tank 1 may be connected to an external system. The suspension 6 is a liquid containing one or more kinds of suspended matters dispersed in a medium such as water.

The liquid supplying unit 2 is a suspension supplying unit for supplying the suspension 6 to the flow-through separator 9. A direction a1 indicates a direction where the suspension 6 flows into the liquid supplying unit 2 and corresponds to the Y-direction. The suspension 6 flowing in the liquid supplying unit 2 flows into the flow-through separation unit 3-1 that is a first flow-through separation unit of the flow-through separator 9 through the connecting portion. The detailed configuration of the liquid supplying unit 2 will be described in FIG. 7.

In the flow-through separator 9, a channel through which the suspension 6 flows is configured by connecting the plurality of flow-through separation units 3. The plurality of the flow-through separation units 3 of the flow-through separator 9 is disposed in a stair shape. The suspension 6 flows through the channel of the flow-through separator 9, and the suspended matter in the suspension 6 is separated in the Z-direction. A direction f1 indicates a schematic flow-through direction where the suspension 6 flows into the flow-through separation unit 3 and corresponds to the Y-direction. The plurality of the flow-through separation units 3 is the same types of units and the shapes or the like thereof are the same.

A supply port of the flow-through separation unit 3-1 that is the first flow-through separation unit 3 of the flow-through separator 9 is connected to the liquid supplying unit 2 through the connecting portion. An outlet port of the flow-through separation unit 3-1 is connected to the supply port of the flow-through separation unit 3-2 that is a second flow-through separation unit through the connecting portion. The outlet port of the flow-through separation unit 3-M that is the flow-through separation unit of a final step of the flow-through separator 9 is connected to the discharging unit 4 through the connecting portion. In each of flow-through separation unit 3 other than the flow-through separation unit 3-1 and the flow-through separation unit 3-M, the outlet port is connected to the supply port of the flow-through separation unit 3 of the subsequent stage through the connecting portion. In addition, an ultrasonic oscillating element 35 of each flow-through separation unit 3 of the plurality of flow-through separation units 3 is electrically connected to the control unit 5 through a signal line.

The control unit 5 is a unit that controls the plurality of flow-through separation units 3 of the flow-through separator 9 and includes a signal driving unit 51. The control unit 5 can be configured by, for example, an LSI substrate or the like. The signal driving unit 51 generates a driving signal for generating ultrasonic waves from the ultrasonic oscillating element 35 of the flow-through separation unit 3 and supplies the driving signal to the ultrasonic oscillating element 35 through a signal line. In Embodiment 1, the control unit 5 simultaneously drives the ultrasonic oscillating element 35 of each of the plurality of the flow-through separation units 3 using the same driving signal.

The discharging unit 4 is a suspension discharging unit for discharging and finally separating a separated liquid, which is the suspension 6 separated and discharged from the flow-through separator 9. A direction b1 indicates a direction where the suspension 6 flows into the discharging unit 4 and corresponds to the Y-direction. The discharging unit 4 finally separates the separated liquid into a clear liquid and a concentrated liquid and discharges the separated liquid. The detailed configuration of the discharging unit 4 will be described in FIG. 8. The discharging unit 4 discharges the clear liquid to the clear liquid discharging unit 7 and discharges the concentrated liquid to the concentrated liquid discharging unit 8.

The clear liquid discharging unit 7 is a unit where the clear liquid discharged from the discharging unit 4 is accumulated or discharged. The concentrated liquid discharging unit 8 is a unit where the concentrated liquid discharged from the discharging unit 4 is accumulated or discharged. The clear liquid discharging unit 7 and the concentrated liquid discharging unit 8 may connect the external system.

Each unit which configures the suspension flow-through separation apparatus 10 includes a connecting portion for connecting the units, for example, a connecting portion 38 that connects flow-through separation units 3. The connecting portion can be configured by means such as screwing at a flange at an end portion of a piping, and is not limited. In addition, the connecting portion includes means such as an openable and closable valve for regulating a flow of a fluid.

The plurality of the flow-through separation units 3 of the flow-through separator 9 is provided with a number M corresponding to the separation ability required for the suspension flow-through separation system. The number M can be adjusted for increase and decrease as necessary. The number M can be adjusted according to circumstances such as the size of the space in which the suspension flow-through separation system is provided. In a case where the number of the flow-through separation unit 3 is increased, the entire separation ability can be increased instead of increasing an arrangement space of the flow-through separator 9. In a case where the number of the flow-through separation unit 3 is decreased, the arrangement space of the flow-through separator 9 can be reduced instead of decreasing the entire separation ability. Even after constructing the suspension flow-through separation system once, the separation ability can be changed by increasing and decreasing the flow-through separation unit 3. According to Embodiment 1, by adjusting the number M of the flow-through separation unit 3, a fixable system construction or the like which cannot be realized by a conventional system and which is compatible with the separation ability and space convenience.

When increasing or decreasing the flow-through separation unit 3, a connection state of the connecting portion between units is changed. In the case of an increase, the flow-through separation unit 3 to be added is connected between desired units. For example, the connection state of each connecting portion between the flow-through separation unit 3-M and the discharging unit 4 is canceled, and an additional (M+1)-th flow-through separation unit 3 is connected to a position between them. In a case of a decrease, the flow-through separation unit 3 between the desired units is removed, and the previous and next units are connected to each other. For example, the connection state of each connecting portion between the flow-through separation unit 3-M and the previous and next units is released, the flow-through separation unit 3-M is removed, and the previous and next units are connected to each other through the connecting portion.

Maintenance replacement can be easily performed for each flow-through separation unit 3. In this case, for example, in a case of maintenance, after stopping and discharging the flow-through or the like at the flow-through separator 9, the connection state of the connecting portion between the previous and next units of a target flow-through separation unit 3, and the target flow-through separation unit 3 is removed. After the maintenance operation of the target flow-through separation unit 3, the flow-through separation unit 3 is connected again to an original position. In addition, in a case of replacing apart of the failed flow-through separation unit 3, the target flow-through separation unit 3 is removed, and a new flow-through separation unit 3 to be replaced is connected to the position. Even in a case where flow-through separation processing is stopped due to failure of a part of the unit or the like, it is possible to restart the flow-through separation processing without stopping the processing for a long time by connecting an alternative unit.

In the suspension flow-through separation system, the suspended matter can be separated with high efficiency while flowing through the suspension 6 by the suspension flow-through separation apparatus 10, and the suspended matter can be discharged as the clear liquid and the concentrated liquid. Accordingly, the suspension flow-through separation system does not require the provision of a large septic tank or the like as in the conventional system, and can be realized in a space saving manner.

(Flow-Through Separation Method)

A suspension flow-through separation method of Embodiment 1 is a method having the following steps to be performed in the suspension flow-through separation apparatus 10 of FIG. 1. The suspension flow-through separation method of Embodiment 1 includes a step of supplying the suspension 6 by the liquid supplying unit 2 to the flow-through separator 9, a step of capturing the suspended matter of the suspension 6 by ultrasonic waves and discharged in the vertical direction while flowing through the suspension 6 in the channel of the flow-through separator 9, and a step of discharging the suspension 6 that is the separated liquid which is discharged from the flow-through separator 9 and in which the suspended matter is separated in the z-direction into the clear liquid and the concentrated liquid.

(Flow-Through Separation Unit (1))

Figure 2:
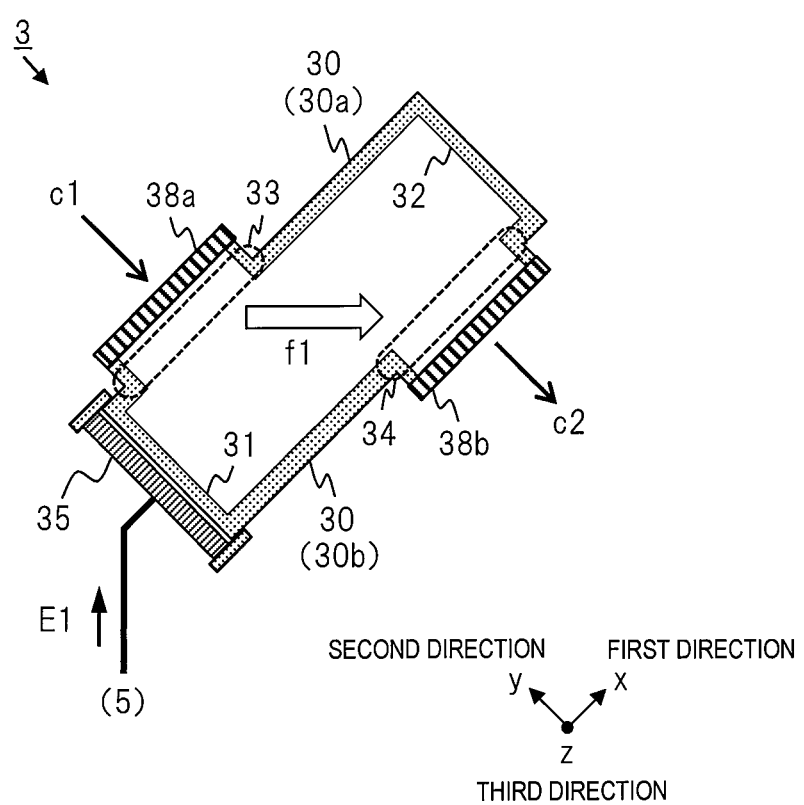
FIG. 2 is a diagram illustrating a structure of a flow-through separation unit on the xy cross section in Embodiment 1.

FIG. 2 is a diagram illustrating a structure of a flow-through separation unit 3 on the xy cross section which is configured by the x-direction and the y-direction in Embodiment 1. In FIG. 2, the longitudinal direction of the flow-through separation unit 3 is defined as the x-direction which is the first direction, and the direction orthogonal to the x-direction is defined as (x, y, z) which is the coordinate system viewed by the flow-through separation unit 3 And the y direction which is the second direction.

The z-direction that is a third direction is a vertical direction similar to the Z-direction.

The flow-through separation unit 3 has a cavity structure functions as the channel through which the suspension 6 flows and to which the ultrasonic waves emit. The cavity structure is a structure in which the inside is a hollow, and is a piping having a unique shape. The flow-through separation unit 3 includes a side surface portion 30 having the cavity structure, a first planar portion 31, a second planar portion 32, a supply port 33, an outlet port 34, an ultrasonic oscillating element 35, a connecting portion 38a, and a connecting portion 38b. The flow-through separation unit 3 includes the side surface portion 30 extending in the x-direction among the horizontal direction in the cavity structure, and the first planar portion 31 and the second planar portion 32 that are two planar portions which are extending in the y-direction among the horizontal direction and facing each other. In a coordinate space (x, y, z), in the flow-through separation unit 3, the side surface portion 30 corresponding to the longitudinal direction is disposed along the x-direction, and the first planar portion 31 and the second planar portion 32 are disposed along the y-direction.

The side surface portion 30 includes a first side surface portion 30a that is one upstream side in the y-direction, and a second side surface portion 30b that is other downstream side in the y-direction. The supply port 33 through which the suspension 6 is supplied is provided at the first side surface portion 30a. The outlet port 34 through which the suspension 6 is discharged is provided at the second side surface portion 30b. The supply port 33 supplies the suspension 6 into the cavity structure in the y-direction. The outlet port 34 discharges the suspension 6 from inside the cavity structure in the y-direction.

The connecting portion 38a is provided near the outside of the supply port 33. The connecting portion 38b is provided near the outside of the outlet port 34. The connecting portion 38a and the connecting portion 38b can be connected to the connecting portion of the other units by means of the above-described flange, screwing, or the like. In addition, the connecting portion 38a and the connecting portion 38b may include the above-described valve or the like. For example, the connecting portion 38a of the supply port 33 of the flow-through separation unit 3-1 is connected to the connecting portion of the liquid supplying unit 2. The connecting portion 38b of the outlet port 34 of the flow-through separation unit 3-1 is connected to the connecting portion 38a of the supply port 33 of the flow-through separation unit 3-2. The connecting portion 38b of the outlet port 34 of the flow-through separation unit 3-M is connected to the connecting portion of the discharging unit 4. The cavity structures of the plurality of the flow-through separation units 3 are connected to each other through the connecting portion, and the continuing channels are configured.

Two planar portions of the first planar portion 31 and the second planar portion 32 are a set facing each other in the x-direction, and have a closed yz plane. One planar portion in the x-direction is defined as the first planar portion 31, and the other planar portion is defined as the second planar portion 32.

In the flow-through separation unit 3, at least one of the first planar portion 31 and the second planar portion 32 includes an ultrasonic oscillator, and in Embodiment 1, the first planar portion 31 includes the ultrasonic oscillator. The ultrasonic oscillator is a portion that the ultrasonic waves are generated to the channel based on the driving signal and emitted to the suspension 6, and includes the ultrasonic oscillating element 35. The ultrasonic oscillating element 35 is connected to the control unit 5 through the signal line.

The ultrasonic oscillating element 35 is fixed to the outside of the first planar portion 31 in parallel to the first planar portion 31 and the second planar portion 32. The ultrasonic oscillating element 35 has a flat shape having a yz plane. The first planar portion 31 provided with the ultrasonic oscillating element 35 functions as an ultrasonic generator, and the second planar portion 32 functions as an ultrasonic wave reflection portion. In the ultrasonic oscillating element 35, for example, a frame portion is fixed to a frame portion of the first planar portion 31.

The control unit 5 supplies a driving signal E1 to the ultrasonic oscillating element 35 and drives the ultrasonic oscillating element 35. The ultrasonic oscillating element 35 vibrates based on the supplied driving signal E1, generates the ultrasonic waves to the channel of the cavity structure, and emits the ultrasonic waves to the suspension 6 in the channel. The first planar portion 31 also vibrates as the ultrasonic oscillating element 35 vibrates.

In the flow-through separator 9, the suspended matter in the suspension 6 is captured by the ultrasonic waves and separated in the z-direction that is the vertical direction while the suspension 6 flows through the channel of the flow-through separation unit 3. The separated suspension 6 is discharged from the flow-through separator 9.

A direction c1 indicates a schematic direction of a flow when the suspension 6 from the supplying unit 2 or the flow-through separation unit 3 that is the previous stage units flow through the supply port 33 and is supplied, and corresponds to the y-direction. A direction c2 indicates a schematic direction of a flow when the internal suspension 6 is discharged to the discharging unit 4 or the flow-through separation unit 3 that are the next stages units through the outlet port 34, and corresponds to the y-direction in the same manner.

An angle formed by the x-direction or the y-direction of the flow-through separation unit 3 and a direction f1 of the flow-through corresponding to a straight line connecting a center point of the supply port 33 when the suspension 6 flows through from the supply port 33 to the outlet port 34 and a center point of the outlet port 34 is defined as a first angle. The first angle is an acute angle.

(Flow-Through Separation Unit (2))

Figure 3:
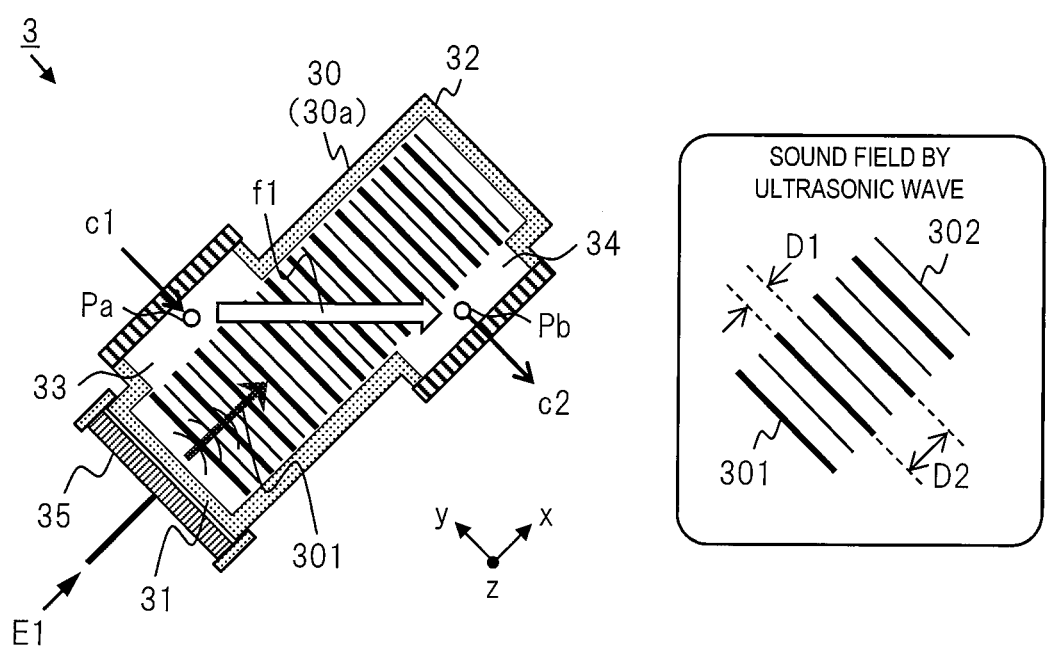
FIG. 3 is a diagram illustrating an ultrasonic wave or of a schematic flow-through direction of the flow-through separation unit on the xy cross section in Embodiment 1.

The flow-through separation unit 3 will be described in detail using FIG. 3 or the like. FIG. 3 illustrates a sound field due to the ultrasonic waves of the flow-through separation unit 3 or a schematic flow-through direction in the xy cross section as in FIG. 2. The center point of the supply port 33 is indicated as Pa, and the center point of the outlet port 34 is indicated as Pb. In the cavity structure of the flow-through separation unit 3, a flow of the suspension 6 in the direction f1 as a schematic flow-through direction is provided. The direction f1 corresponds to a direction of the straight line connecting from the center point Pa of the supply port 33 and the center point Pb of the outlet port 34. In Embodiment 1, in the flow-through separation unit 3, a shape of the cavity structure or positions of the supply port 33 and the outlet port 34 are designed such that the direction f1 is formed.

The suspension 6 flows into the cavity structure from the supply port 33 of the first side surface portion 30a at the upstream side of the flow-through unit 3. The inflow suspension 6 mainly flows into the cavity structure along the direction f1, and is discharged from the outlet port 33 of the downstream side second side surface portion 30b.

The ultrasonic oscillating element 35 is driven after receiving the driving signal E1 that is an electric signal and generates the ultrasonic waves by vibration. On the other hand, the ultrasonic oscillating element 35 converts the electric signal into the ultrasonic vibration, and generates the ultrasonic waves to the channel inside the cavity structure through the first planar portion 31. The ultrasonic waves are emitted to the suspension through which flows the channel inside the cavity structure as a whole. The ultrasonic waves are a sound wave is a sound wave having a predetermined high vibration frequency. The ultrasonic waves generated through the first planar portion 31 propagate in the ultrasonic wave propagation direction 301 corresponding to the x-direction in the cavity structure. Furthermore, the ultrasonic waves propagating toward the second planar portion 32 in the x-direction are reflected toward the first planar portion 31 at the second planar portion 32. By the ultrasonic waves, a strong standing wave along the x-direction is formed in the channel in the cavity structure. The standing wave is a sound field corresponding to the unique frequency of the ultrasonic oscillating element 35.

In the sound field due to the standing wave, as illustrated on the right side of FIG. 3, a node 301 and an antinode 302 are periodically expressed in the x-direction. The node 301 is a region where a sound pressure is high. The antinode 302 is a region where a sound pressure is low. A distance between the node 301 and the antinode 302 is a distance in accordance with the unique frequency of the ultrasonic waves. The distance between the node 301 and the antinode 302 is indicated by a distance D1. The distance between the nodes 301 and the antinodes 302 is indicated by a distance D2.

The suspension 6 flows in the channel of the cavity structure in which the sound field is formed by the standing wave. In this case, the suspended matter contained in the suspension 6 which flows the channel is captured at the position of the nodes 301 or the antinode 302 in the standing wave, and separated in the vertical direction. Specifically, in a case where there is the suspended matter that is sufficiently smaller than the distance D1 between the node 301 and the antinode 302, the suspended matter receives a force toward the node 301 or the antinode 302 according to its physical property value. Accordingly, the suspended matter is captured at the position of the ultrasonic wave propagation direction 301 or the antinode 302. The captured suspended matter aggregates mainly due to intermolecular force. The capturing position is included in the entire region in which the sound field of the cavity structure is formed.

When the captured suspended matter becomes aggregated to a certain size, the suspended matter floats upward in the z-direction due to its own weight or it sinks downward in the Z-direction due to its own weight. The suspended matter in the case of floating reaches the upper side surface portion (an upper surface portion 30c in FIG. 5) of the side surface portion 30 of the cavity structure. The suspended matter in the case of settling reaches the lower side surface portion (the lower surface portion 30d in FIG. 5) of the side surface portion 30 of the cavity structure. For example, in a case where a density of the suspended matter of the suspension 6 is larger than that of the medium, since its own weight is increased due to aggregation, it is settled downward in the z-direction. Embodiment 1 has a configuration corresponding to the case of separating the suspension 6 containing the suspended matter having such a settling characteristic as a target.

The suspension 6 in which the ultrasonic waves in the channel of the flow-through separation unit 3 are separated so that the suspended matter sinks to the lower surface portion of the cavity structure through the above capturing action. Therefore, at a time point when the suspension 6 is discharged to the outside from the outlet port 34 of the flow-through separation unit 3, the number of the suspended matter per volume is relatively smaller in the suspended matter in the upper part in the z-direction than in the suspended matter in the lower part in the z-direction. That is, the suspended matter is separated above and below the z-direction. The degree of the separation progresses so as to sequentially pass through the plurality of the flow-through separation unit 3. After passing through a plurality of the flow-through separation unit 3, the suspension 6 separated so that the suspended matter is concentrated downward in the z-direction is discharged.

The suspension 6 flows in the direction f1 that is the schematic flow-through direction in the channel of the cavity structure, and flows through the node 301 or the antinode 302 of the sound field at that time. The first angle formed by the ultrasonic wave propagation direction 301 corresponding to the x-direction and the direction f1 of the flow-through is the acute angle. The straight line between the center point Pa and the center point Pb along the direction f1 flows through a plurality of nodes 301 or antinodes 302. The greater the number of nodes 301 and antinodes 302 passing through in the direction f1, the stronger the influence of supplementing the suspended matter becomes, and the separation ability of the suspended matter becomes higher. The number of the nodes 301 and the antinodes 302 passing through in the direction f1 can be designed and calculated. Since the space between the nodes 301 or the antinodes 302 of the sound field is determined according to the shape of the cavity structure or the characteristics or control of the generation of the ultrasonic waves, the number of flows can be calculated from the space.

(Flow-Through Separation Unit (3))

Figure 4:
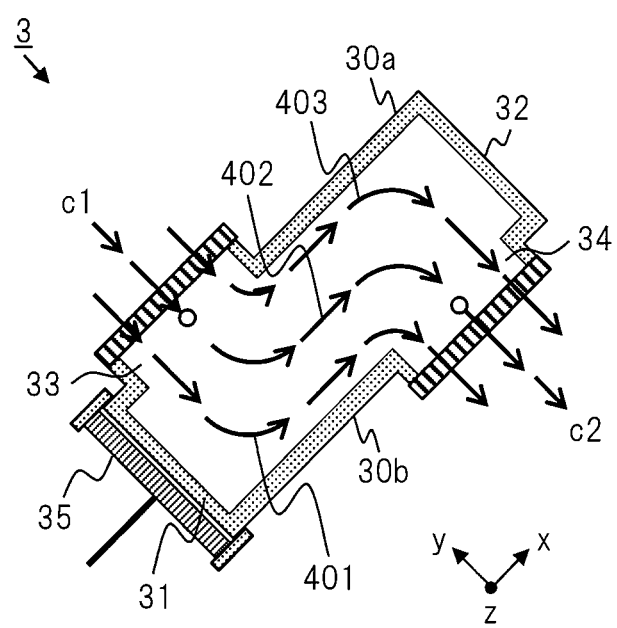
FIG. 4 is a diagram illustrating a detailed flow-through direction of the flow-through separation unit on the xy cross section in Embodiment 1.

FIG. 4 illustrates a detailed example of a flow-through direction of the flow-through separation unit 3 on the xy cross section. In the channel in the cavity structure of the flow-through separation unit 3, when flow-through of the suspension 6, detailed flow-through direction and flow distribution are formed according to the shape of the cavity structure, the flow rate, and the like. In FIG. 4, a part of the example of the detailed flow-through direction is simply indicated by arrows. The suspension 6 flowing into the cavity structure is shielded by the second side surface portion 30b at the end and bent as in the example of a flow 401 based on the y-direction that is a direction c1 of the flow of the supply port 33. That is, a flow 402 in the x-direction from the first planar portion 31 to the second planar portion 32 is formed. The flow 402 is shielded by the second planar portion 32 ahead and bends in the y-direction toward the outlet port 34 as in the example of the flow 403. The flow is the flow direction c2 of the outlet port 34. In particular, the flow in the x-direction, such as the flow 402, flows through many of the node 301 and antinodes 302 of the sound field of FIG. 3.

[Flow-Through Separation Unit (4)]

Figure 5:
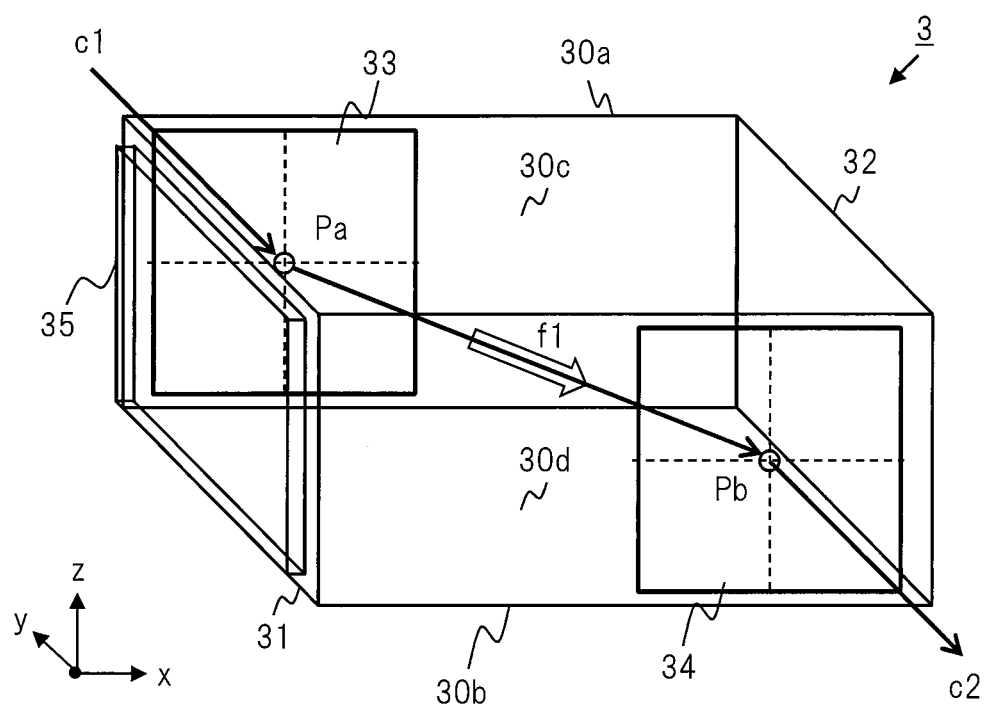
FIG. 5 is a perspective view illustrating a configuration of the flow-through separation unit in Embodiment 1.

FIG. 5 illustrates a configuration of the flow-through separation unit 3 in a perspective view. The cavity structure of the flow-through separation unit 3 of Embodiment 1 has a rectangular parallelepiped shape. In the cavity structure and the ultrasonic oscillating element 35, it is preferable that the shape of each yz cross section in the x-direction be the same from the viewpoint of efficient sound field formation. In Embodiment 1, the shape of each yz cross section in the x-direction is almost the same rectangle. The first planar portion 31 and the second planar portion 32 have a rectangular yz plane. The ultrasonic oscillating element 35 has a rectangular yz plane that is almost the same as the first planar portion 31.

The shape of the cavity structure of the flow-through separation unit 3 is not limited to a rectangular parallelepiped, and may be a cylindrical shape or the like as another embodiment. The cavity structure of the flow-through separation unit 3 can be configured by, for example, a metal or a resin piping, but it is not limited thereto, and it may be made of another material.

In FIG. 5, the side surface portion 30 includes the first side surface portion 30a and the second side surface portion 30b including four side surface portions extending to the longitudinal direction of the rectangular parallelepiped and having the xz plane, and an upper surface portion 30c and a lower surface portion 30d having the xy plane. In the first side surface portion 30a, the supply port 33 is provided in a position and a region near the first planar portion 31 in the x-direction. In the second side surface portion 30b, the outlet port 34 is provided in a position and a region near the second planar portion 32 in the x-direction. The supply port 33 has a rectangular opening centered on the center point Pa. The outlet port 34 has a rectangular opening centered on the center point Pb. The shapes of the supply port 33 and the outlet port 34 are not limited to rectangular openings, and may be circular openings or the like.

[Flow-Through Separation Unit (5)]

Figure 6:
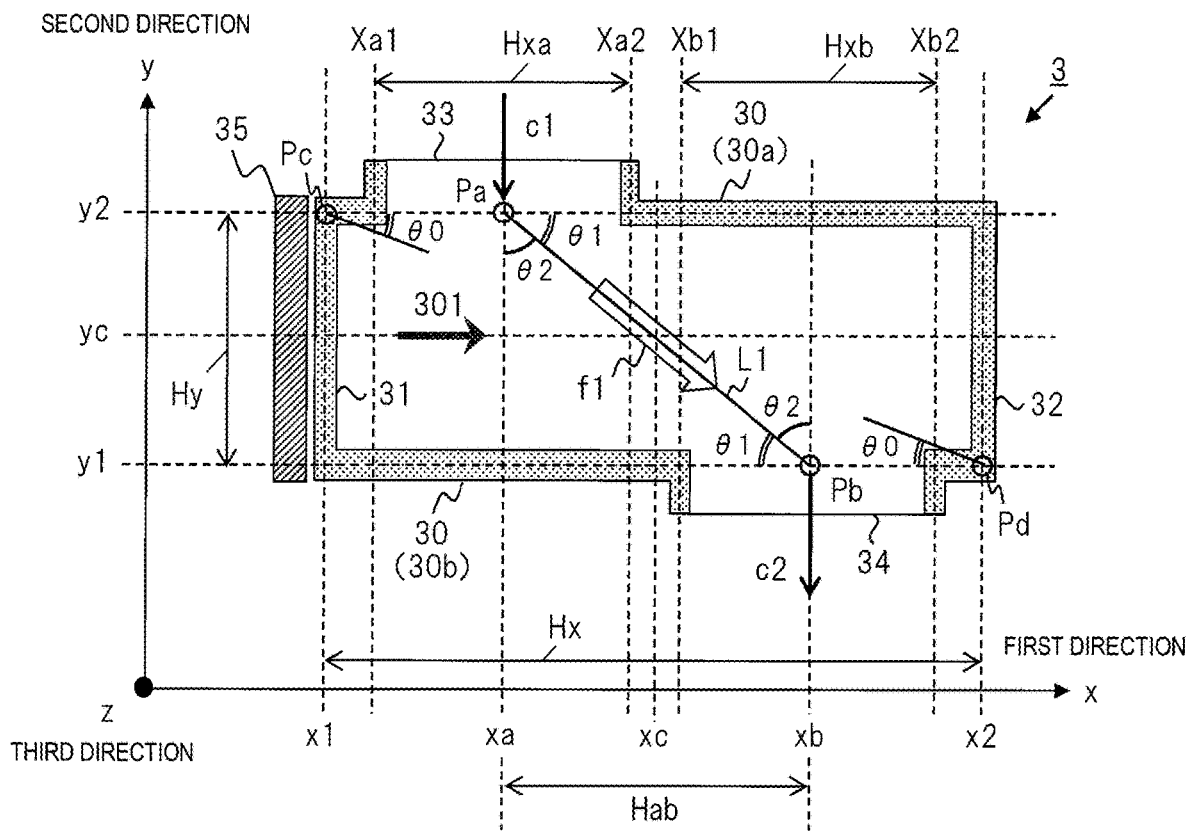
FIG. 6 is a view illustrating a configuration such as a size and the like of the flow-through separation unit in a xy cross section in Embodiment 1.

FIG. 6 illustrates a configuration such as a size and the like of the flow-through separation unit 3 in a xy cross section. The length of the side surface portion 30 in the x-direction corresponding to the longitudinal direction and the long axis direction of the cavity structure is indicated by a width Hx. The width Hx is the length from a position x1 of the first planar portion 31 to a position x2 of the second planar portion 2. A position xc indicates a center of the width Hx in the x-direction. In addition, lengths of the first planar portion 31 and the second planar portion 32 in the y-direction corresponding to the short axis direction are indicated by a width Hy. The width of the ultrasonic oscillating element 35 is almost the same as the width Hy. The width Hy is the length from a position y1 of the second side surface portion 30b to the position y2 of the first side surface portion 30a. A position yc indicates the center of the width Hy in the y-direction.

The position of the center point Pa of the supply port 33 of the first side surface portion 30a is indicated by a position xa. The width of the supply port 33 in the x-direction is indicated by a width Hxa. The width Hax is a length from a position xa1 to a position xa2. The position of the center point Pb of the outlet port 34 of the second side surface portion 30b is indicated by a position xb. The width of the outlet port 34 in the x-direction is indicated by a width Hxb. The width Hxb is a length from the position Xb1 to the position xb2. The region of the width Hxa of the supply port 33 is positioned on the left side of the position xc and the region of the width Hxb of the outlet port 34 is positioned on the right side of the position xc.

The x-direction corresponding to the longitudinal direction of the cavity structure of the flow-through separation unit 3 and the ultrasonic wave propagation direction 301 and the schematic direction f1 of the flow-through necessarily form an angle θ1. The x-direction also corresponds to the direction including the opening surface of the supply port 33 or the outlet port 34 of the side surface portion 30. In addition, the y-direction corresponding to the first planar portion 31 and the second planar portion 32 of the cavity structure, the direction c1, and the direction c2 and the schematic direction f1 of the flow-through necessarily form an angle θ2. The y-direction also corresponds to the direction that configures the vibrating surface of the ultrasonic oscillating element 35 or a surface of the antinode or the node of the ultrasonic waves. The angle θ1 and the angle θ2 are the acute angle. On the other hand, the schematic direction f1 of the flow-through is a direction different from the x-direction and the y-direction, and the direction, and is a direction oblique to entry and exit directions c1 and c2 of the suspension 6.

In the xy cross section of the cavity structure, a straight line connecting the center point Pa of the supply port 33 and the center point Pb of the outlet port 44 is indicated by a straight line L1. The schematic direction f1 of the flow is on the straight line L1. The angle θ1 indicates an acute angle formed by the x-direction corresponding to the side surface portion 30 in the long axis direction and the ultrasonic wave propagation direction 301 and the direction f1 corresponding to the straight line L1. The angle θ2 indicates an acute angle formed by the inflow direction c1, the outflow direction c2, the y-direction corresponding to the short axis direction, and the direction f1 corresponding to the straight line L1. The unit of the angle is indicated by ° degree. (θ1+θ2)=90° is satisfied.

In addition, one point on a diagonal of the rectangle of the xy plane of the cavity structure is defined as Pc, and the other point is defined as Pd. There is a diagonal line connecting the point Pc and the point Pd. The angle θ0 indicates the angle formed by the x-direction and its diagonal line. The length and the angle θ0 of the diagonal line are determined from the width Hx and the width Hy.

As described above, the width Hx has a predetermined limit on the maximum length in order to form a sound field capable of capturing suspended matter and a standing wave. In a case where the width Hx is too large, the sound field capable of capturing suspended matter cannot be formed. An upper limit value for the width Hx is set as the width Hg. The width Hx is less than the width Hg (Hx≤Hg).

In addition, in the x-direction, the distance between the position xa of the center point Pa of the supply port 33 and the position xb of the center point Pb of the outlet port is indicated by the distance Hab. The flow-through separation unit 3 necessarily has the distance Hab (Hab>0) corresponding to the formation of the flow-through direction f1. The direction c1 and the direction c2 of the inlet and outlet flows in the flow-through separation unit 3 have a deviation at the distance Hab.

In Embodiment 1, a configuration condition of the flow-through separation unit 3 includes configuration conditions indicated by the following expression.

$$\theta 0 < \theta 1 < 90° \quad (1)$$

$$0° < \theta 2 < (90° - \theta 0) \quad (2)$$

$$0° < Hab < Hx \leq Hg \quad (3)$$

$$Hx < Hy \quad (4)$$

On the other hand, conditions of Expressions (1) and (2) are as follows. The angle θ1 and the angle θ2 are the acute angle. The upper limit of the angle θ1 is smaller than 90° (θ1<90°). The lower limit of the angle θ1 is an angle larger than the angle θ0 (θ0<θ1). The condition of Expression (2) with respect to Expression (1) is a paraphrase using the angle θ2. According to the condition of Expression (1), a schematic flow direction f1 is formed to have an angle θ1 with respect to the x-direction. According to the condition of Expression (2), a schematic flow direction f1 is formed to have an angle θ2 with respect to the y-direction.

The condition of Expression (3) is a condition relating to the distance Hab representing the positional relationship in the x-direction between the supply port 33 and the outlet port 34. The supply port 33 and the outlet port 34 are disposed in a state where the positions of the center point and the center axis are shifted in the x-direction. Therefore, the distance Hab between the position xa and the position xb is generated. The distance Hab is larger than 0 and smaller than the width Hx.

The condition of Expression (4) is that the width Hx is larger than the width Hy as the shape of the cavity structure. This condition is a condition that the side surface portion 30 providing the supply port 33 and the like is the long axis direction and the first planar portion 31 or the like provided with the ultrasonic oscillating element 35 is the short axis direction.

The dimension including the dimension of the internal region of the cavity structure of the flow-through separation unit 3 is designed so as to form a flow in the direction f1 by using an angle or the like that satisfies the above conditions. The height dimension in the z-direction is not particularly limited as long as it has a sufficient height to enable separation after capturing the suspended matter.

In Embodiment 1, in the x-direction of FIG. 6, the supply port 33 is provided on the left side that generates ultrasonic waves from the ultrasonic oscillating element 35 and the outlet port 34 is provided on the opposite side to the right side. The present invention is not limited thereto, as a modification example, the supply port 33 may be provided on the right side in the x-direction and the outlet port 34 may be provided on the left side. In addition, the ultrasonic oscillating element 35 may be provided in the second planar portion 32 instead of the first planar portion 31.

In addition, in Embodiment 1, the width Hxa and the position xa 2 of the supply port 33 are provided on the left side of the center position xc in the x-direction of FIG. 6, the width Hxb and the position xb1 of the outlet port 34 are provided on the right side. It is not limited to thereto, as a modification example, it is also possible to adopt a configuration in which the width Hxa or the width Hxb is provided so that the center position xc is included under the condition having the distance Hab.

Further, in Embodiment 1, the opening area of the supply port 33 and the opening area of the outlet port 34 are the same. It is not limited thereto, as a modification example, the opening area of the supply port 33 and the opening area of the outlet port 34 may be different.

[Liquid Supplying Unit]

Figure 7:
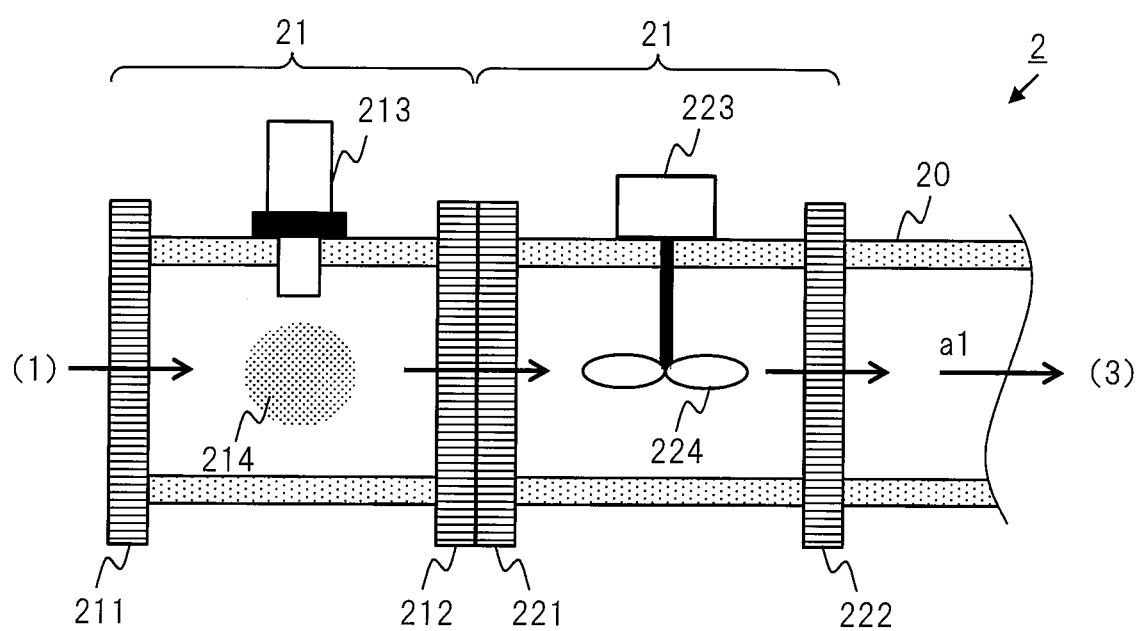
FIG. 7 is a diagram illustrating a configuration of a liquid supplying unit on a ZY cross section in Embodiment 1.

FIG. 7 illustrates a configuration of the liquid supplying unit 2 on a ZY cross section. In the liquid supplying unit 2, a medicine supply unit 21 and a stirring unit 22 are provided in order in a major piping 20 in the Y-direction. An outlet port 212 of the medicine supply unit 21 and a supply port 221 of the stirring unit 22 are connected and connected as a channel. The suspension 6 from the flow-through tank 1 flows into the medicine supply unit 21. The suspension 6 flowing from the stirring unit 22 flows through the supply port 33 of the flow-through separation unit 3-1.

The medicine supply unit 21 includes a supply port 211, the outlet port 212, and a medicine supplier 213.

The medicine supplier 213 supplies a medicine 214 into the channel of the piping 20. The suspension 6 from the flow-through tank 1 flows from the supply port 211, becomes the suspension 6 in which the medicine 214 is added and mixed, and discharged from the outlet port 212. The medicine 214 is intended to promote aggregation of the suspended matter of the suspension 6, water quality adjustment such as pH, or the like.

The stirring unit 22 includes the supply port 221, an outlet port 222, a motor 223, and a stirring blade 224. The motor 223 rotates the connected stirring blade 224. Accordingly, the stirring function of the suspension 6 containing the medicine 214 is realized. The suspension 6 mixed with the medicine 214 from the medicine supply unit 21 flows in from the supply port 221, is stirred, and flows out from the outlet port 222.

By performing a process of supplying the medicine 214 and stirring the suspension 6 in the liquid supplying unit 2 before performing the ultrasonic treatment in the flow-through separator 9, it is possible to shorten the separation time of the suspended matter. In addition, it is also possible to aggregate the suspended matter of a diameter of several hundreds of nm, which is difficult to separate normally. By using such a liquid supplying unit 2, separation of the suspension 6 can be realized more efficiently.

In addition, a connecting portion that can be connected and disconnected may be provided at each of the supply port and the outlet port of the medicine supply unit 21 or the stirring unit 22. That is, the medicine supply unit 21 or the stirring unit 22 may be provided as a functional unit that can be connected as required. In this case, maintenance replacement for each functional unit is possible.

In Embodiment 1, the liquid supplying unit 2 and the discharging unit 4 are provided before and after the flow-through separator 9. The liquid supplying unit 2 and the discharging unit 4 may be units having other functions. In the modification example, the liquid supplying unit 2 may be a unit without the medicine supply unit and the stirring unit. In addition, a driving unit for regulating a flow rate or the like in a case of flow-through of the suspension 6 of the flow-through separator 9 may be provided in at least one of the liquid supplying unit 2 and discharging unit 4. The driving unit can be constituted by, for example, a pump or the like.

[Discharging Unit]

Figure 8:
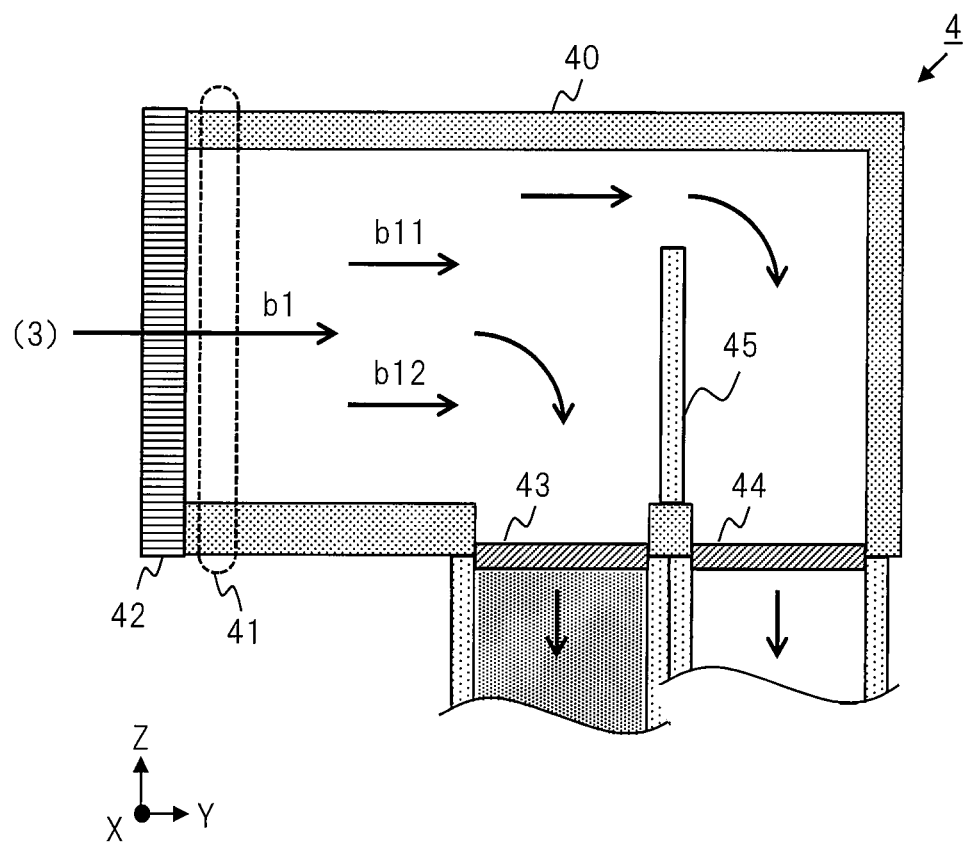
FIG. 8 is a diagram illustrating a structure of a discharging unit on the ZY cross section in Embodiment 1.

FIG. 8 illustrates a configuration of the discharging unit 4 on the ZY cross section. The discharging unit 4 includes a liquid separation unit 40 that is a major piping, a receiving port 41, a connecting portion 42, a concentrated liquid outlet port 43, a clear liquid outlet port 44, and a partition plate 45. The connecting portion 42 is provided at the receiving port 41 of the liquid separation unit 40, and is connected to the connecting portion 38b of the outlet port 34 of the previous stage flow-through separation unit 3-M. On the downstream side of the liquid separation unit 40 in the Y direction, the partition plate 45 is provided so as to be erected from the bottom surface of the liquid separation unit 40 in the Z-direction, and a part of the partition plate 45 above in the Z-direction is open. In a predetermined region on the bottom surface of the liquid separation unit 41 in the Z-direction, on the boundary of the partition plate 45, the concentrated liquid outlet port 43 is provided on the upstream side and the clear liquid outlet port 44 is provided on the downstream side.

The separated liquid, which is the suspension 6 discharged from the outlet port 34 of the flow-through separation unit 3-M, is supplied to the inside through the connecting portion 42 and the receiving port 42 of the discharging unit 4 and flows in the Y-direction. The direction b1 indicates the flow of the separated liquid. A direction b11 indicates a flow in the upper part in the X-direction in which the suspended matter is small among the flow of the separated liquid, and a direction b12 indicates a flow in the lower portion in the Z-direction where there is much suspended matter.

In the liquid separation unit 40, the separated liquid is shielded by the partition plate 45 and separated into a component in the upper part in the Z-direction and a component in the lower part in the Z-direction. That is, the component in the upper part in the Z-direction which does not contain much suspended matter indicated by the direction b11 flows through the region beyond the partition plate 45, and separated and discharged as the clear liquid through the clear liquid outlet port 44 on the bottom surface of the region. The clear liquid is supplied to the clear liquid discharging unit 7. In addition, on the other hand, the component in the lower part in the Z-direction containing a lot of suspended matter, which is indicated by the direction b12, cannot pass through the partition plate 45, and is discharged as the concentrated liquid through the concentrated liquid outlet port 43 on the bottom surface in the front region. The concentrated liquid is supplied to the concentrated liquid discharging unit 8. In such a manner, in the discharging unit 4, the separated liquid is finally separated into a concentrated liquid containing a lot of the suspended matter and a clear liquid containing almost no suspended matter.

The partition plate 45 or the outlet port is designed according to the characteristic of the suspended matter to be separated. In Embodiment 1, as described above, since the suspended matter has properties of settling, apart of the upper part of the partition plate 45 in the Z-direction is opened. In the case where there are the properties that the suspended matter is floating, the partition plate 45 of the liquid separation unit 40 is designed such that the lower side in the Z-direction is an opening, and each outlet port is provided on the upper surface in the Z direction of the liquid separation unit 40. The partition plate 45 of the liquid separation unit 40 may have a mechanism capable of adjusting the length or the position.

(Experiment)

Figure 9:
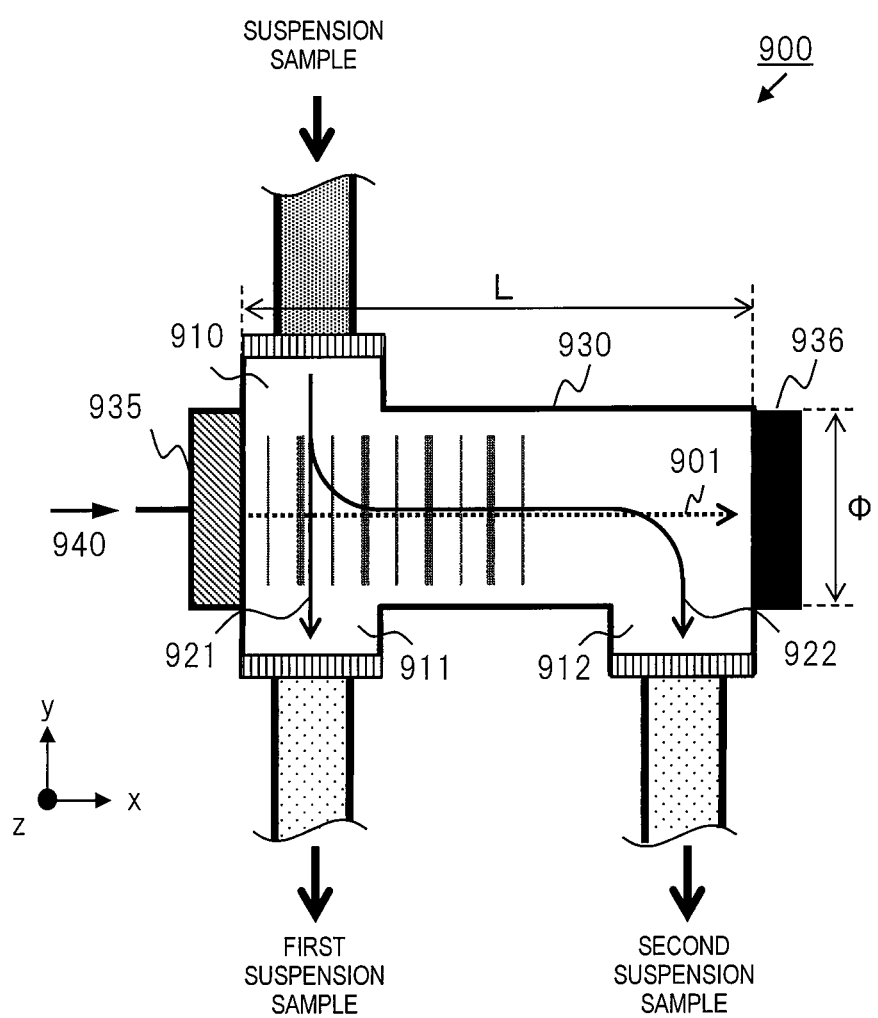
FIG. 9 is a diagram illustrating an experimental model of the flow-through separation unit.

FIG. 9 illustrates an experimental model of the flow-through separation unit. The inventors performed experiments and evaluations using apparatus corresponding to the experimental model. Based on the experiment and evaluation results, the configuration of the flow-through separation unit 3 and the effect of the suspension processing of Embodiment 1 and the configuration and effects of the flow-through separation unit of the comparative example to Embodiment 1 will be compared and described.

The flow-through separation unit 3 of Embodiment 1 is configured based on the experimental model of a flow-through separator 900 of FIG. 9. In the flow-through separator 900, a side surface portion 930 of the cavity structure in the long axis direction is disposed in the x-direction, and a short axis direction is disposed in the y-direction. In the two facing planar portions, an ultrasonic oscillating element 935 is installed on the first planar portion, and a reflection plate 936 is installed on the second planar portion. The ultrasonic oscillating element 935 and the reflection plate 936 are disposed at both ends in the x-direction so as to sandwich the channel of the cavity structure functioning as the ultrasonic radiation unit. The ultrasonic wave generated from the ultrasonic oscillating element 935 propagates in a propagation direction 901 corresponding to the x-direction and is reflected by the reflection plate 936. Accordingly, a sound field having the node and the antinode is formed in the channel of the cavity structure.

The length in the x-direction and an inner diameter in the y-direction in the region of the channel inside the cavity structure are indicated by a width L and a width $\phi$, respectively. In the experimental model, the width L was 150 nm, and the width $\phi$ was 20 mm.

A supply port 910 is provided at one end of the side surface portion 930 in the x-direction, the position on the left side in FIG. 9, and a suspension sample flows from the supply port 910. In addition, in the side surface portion 930 on the opposite side in the y-direction, a first outlet port 911 is provided in one end in the x-direction and at a position corresponding to a supply port 933, and a second outlet port 912 is provided in the other end in the x-direction and at a right side position of FIG. 9.

In the above experimental model, a case where a stopper of the first outlet port 911 is in an opened state and the state where the stopper of the second outlet port 912 is in a closed state is set as a first state. The first state of the flow-through separation unit 3 is set as a comparative example. Conversely, a case where the stopper of the first outlet port 911 is in the closed state and the state where the stopper of the second outlet port 912 is in the opened state is set as a second state. The second state of the flow-through separation unit is a model of the flow-through separation unit 3 of Embodiment 1.

Using the above-described experimental model, a first experiment in the first state and a second experiment in the second state were performed. A first suspension sample discharged from the first outlet port 911 in the first experiment is compared with a second suspension sample discharged from the second outlet port 912 in the second experiment.

In the first experiment in the first state, a part of the suspension sample supplied from the supply port 910 advances straight in the y-direction directly to the first outlet port 911 as indicated by a direction 921. This direction 921 is a direction of 90° orthogonal to the propagation direction 901 of the ultrasonic wave, and the number passing through nodes and antinodes of the sound field is small. On the other hand, in the second experiment in the second state, the flow of the suspension sample supplied from the supply port 910 in the y-direction is bent in the x-direction as indicated by a direction 922 and flowed, flows through along the x-direction, is bent at the end portion in the y-direction, and flows to the second outlet port 912. This direction 922 includes a portion along the propagation direction 901 of the ultrasonic wave, and the number passing through the nodes and the antinodes of the sound field is relatively large.

As the suspension sample used in the present experiment, a suspension containing alumina particles mixed with tap water was used. The average particle diameter of the alumina particles was set to 5 μm, and an addition amount was set to 28 mg/h. The suspension sample was supplied as a flow rate from the supply port 910 at 0.25 mL/min. The ultrasonic oscillating element 935 of the experimental model was driven with a driving signal 940 with a voltage of 150 V at a resonance frequency of 2.26 MHz to generate ultrasonic waves in the channel. The ultrasonic wave is emitted to the suspension sample flowing through the channel. Each of turbidities of a first suspension sample from the first outlet port 911 and a second suspension sample from the second outlet port 912 was measured with a turbidity meter.

In the case of the resonance frequency, the distance between the node and the antinode of the ultrasonic wave is about 0.3 mm. In the x-direction of the cavity structure, there are a plurality of yz planes at the distance between the node and the antinode, and the alumina particles in the suspension sample are captured in the nodes and the antinodes in the yz cross section.

Figure 10:
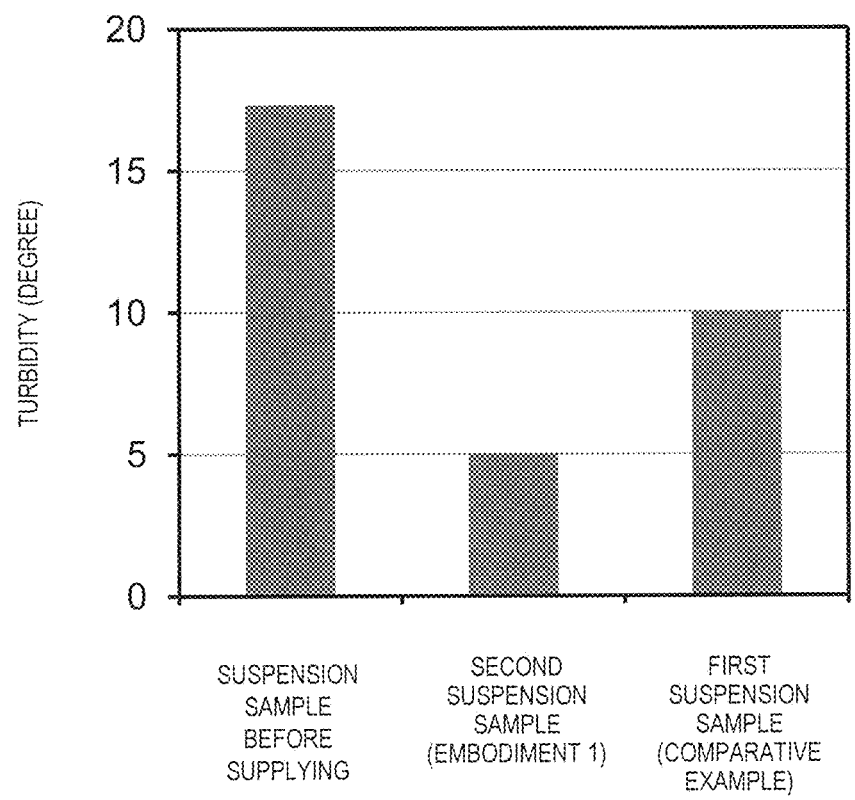
FIG. 10 is a diagram illustrating an experiment result of a separation ability using the experimental model of the flow-through separation unit.

FIG. 10 illustrates a turbidity in each state as the experiment and evaluation results. The left portion of the figure indicates the turbidity of the suspension sample before supplying of the supply port 910. The center portion of the figure indicates the turbidity of the first suspension sample from the first outlet port 911 corresponding to Embodiment 1. The right portion of the figure indicates the turbidity of the second suspension sample from the second outlet port 912 corresponding to Comparative Example 1.

The turbidity is an index value indicating a mixing turbidity degree and transparency degree of the suspension sample, and it is higher as more of the suspended matter alumina particles in the suspension sample are present, and becomes lower as the amount becomes smaller. Low turbidity corresponds to high transparency. The turbidity of the suspension sample whose turbidity was 17.3 degrees as shown in (a) before being supplied to the flow-through separator 900 of the experimental model was reduced by passing through the flow-through separator 900. In a case of the comparative example of (c), the turbidity of the first suspension sample was reduced to 10 degrees.

On the other hand, in the case of Embodiment 1 of (b), the turbidity of the second suspension sample was reduced to 5 degrees. That is, the turbidity of Embodiment 1 of (b) is lower than that of the comparative example of (c), and the separation ability is high.

The alumina particles in the suspension sample are captured on the node or the antinode surface in the cavity structure. Therefore, as the direction 922, the alumina particles passing a lot of the node or antinode surfaces, the number of alumina particles contained in the suspension sample decreases. The first suspension sample discharged from the first outlet port 911 disposed on the straight line of the supply port 910 is discharged without much passing through the node or antinode surface.

On the other hand, the second suspension sample discharged from the second outlet port 912 is discharged after passing through a lot of the node or antinode surfaces. Therefore, the number of the alumina particles in the second suspension sample decreases and the turbidity thereof decreases. As illustrated in FIG. 10, a result that the turbidity of the discharged suspension is varied depending on the difference in the outlet port of the flow-through separation unit 3 is obtained. That is, the turbidity of the second suspension sample discharged through more node surfaces was lower than that of the first suspension sample.

In this way, in a case where the suspended matter in the suspension is captured and aggregated by the ultrasonic wave emission, by designing the flow-through separation unit so that the direction of the flow direction of the suspension is increased so as to increase the number of nodes and antinodes, it was found that the separation ability is high. The flow-through separation unit 3 of the suspension flow-through separation apparatus 10 of Embodiment 1 is designed with the structure illustrated in FIG. 2 or the like so as to correspond to the model of the flow direction 922 of FIG. 9. As a result, in Embodiment 1, as illustrated in FIG. 10(b), the separation ability of the suspended matter can be improved as compared with the comparative example of (c). In addition, in the suspension flow-through separation apparatus 10 of Embodiment 1, by increasing the number M of connections of the flow-through separation unit 3 as the flow-through separator 9, since the nodes or antinodes surfaces through which the suspension flows are further increased, the number of the suspended matters separated from the suspension can be increased. Therefore, separation of the suspension can be further advanced by the flow-through separator 9 than in the case of an apparatus using a single flow-through separation unit. As a result, the clear liquid discharged from the apparatus can be made finer.

In the method for separation of a suspended matter in a suspension of the conventional example, it is possible to increase the nodes and antinodes of ultrasonic waves by lengthening the cavity structure. However, as described above, if the cavity structure is made longer than a certain length, a part of the ultrasonic wave radiated from the ultrasonic oscillating element is absorbed by water or the like and does not reach the reflection plate on the opposite side, and the standing wave having the surface of the node or the antinode surfaces is not formed. On the other hand, in Embodiment 1, the width Hx, which is the distance from the first planar portion 31 to the second planar portion 32 where the ultrasonic oscillating element 35 in the cavity structure of the flow-through separation unit 3 exists, is not made too long, and it is kept below the width Hg. In Embodiment 1, under the limit of the width Hx, a structure including the flow direction f1 is designed as illustrated in FIG. 3 or the like, and the number of the node and antinode surfaces through which the suspension flows is increased as much as possible. Furthermore, as illustrated in FIG. 1, the number of the nodes and antinode surfaces through which the suspension flows through the entire channel of the flow-through separator 9 is increased by connecting a plurality of the flow-through separation units 3. Thus, in Embodiment 1, the separation ability of the suspended matter can be increased as compared with the conventional case.

[Effect or the Like]

As described above, according to the suspension flow-through separation apparatus 10 or the like of Embodiment 1, the high separation ability capable of separation of the suspended matter in the suspension with a high efficiency can be realized. In addition, according to Embodiment 1, required separation ability can be easily realized in a space saving manner. According to Embodiment 1, it is possible to realize simultaneous the flow-through and separation of the suspension in the flow-through separator 9, which is efficient. According to Embodiment 1, it is possible to construct a system having necessary separation ability by increasing and decreasing the flow-through separation unit 3.

The modification examples of the suspension flow-through separation apparatus of Embodiment 1 include the following.

In Embodiment 1, as illustrated in FIG. 1, a space between the connecting portion 38b of the outlet port 34 of the flow-through separation unit 3 and the connecting portion 38a of the supply port 33 of the next stage flow-through separation unit 3 are directly connected to each other. It is not limited thereto, as the modification example, anther flow-through unit may be connected between the connecting portion 38b of the outlet port 34 of the flow-through separation unit 3 and the connecting portion 38a of the supply port 33 of the next stage flow-through separation unit 3. The flow-through unit has a flow-through function of the suspension, and may have the shape different from that of the flow-through separation unit 3 without requiring the suspended matter separation function. The flow-through unit may be, for example, a straight piping. For example, the flow-through unit may be a piping bent at 90 degrees or a piping bent at a predetermined angle. The flow-through unit may be a piping of a shape that converts the flow direction to a predetermined direction such as 180 degrees. Various flow-through units can be selected and used. In the case of using a combination of the above flow-through unit, it is possible to adjust in detail the arrangement position, size, flow-through direction, or the like of the plurality of the flow-through separation units 3 of the flow-through separator 9, whereby enabling a more flexible system construction.

As the modification example, among the plurality of the flow-through separation units 3, the flow-through separation unit 3-1 at a first stage may have a different shape from the other flow-through separation unit 3, and may be a unit integrated with the liquid supplying unit 2. In addition, the flow-through separation unit 3-M at a final stage may have a different shape from the other flow-through separation unit 3, and may be a unit integrated with the discharging unit 4. In a case of the modification example, the plurality of the flow-through separation units 3 of the flow-through separator 9 have a plurality types of units having different shapes.

In Embodiment 1, there is a configuration in which a single control unit 5 collectively controls a plurality of flow-through separation units 3 aim to a simple configuration. It is not limited thereto, and a configuration in which individual control unit is provided for each flow-through separation unit 3 may be provided. In addition, a unit in which the control unit for each flow-through separation unit 3 is provided integrally with an ultrasonic oscillating element 35, as an ultrasonic oscillator may be used.

Modification Example (1)

Figure 11:
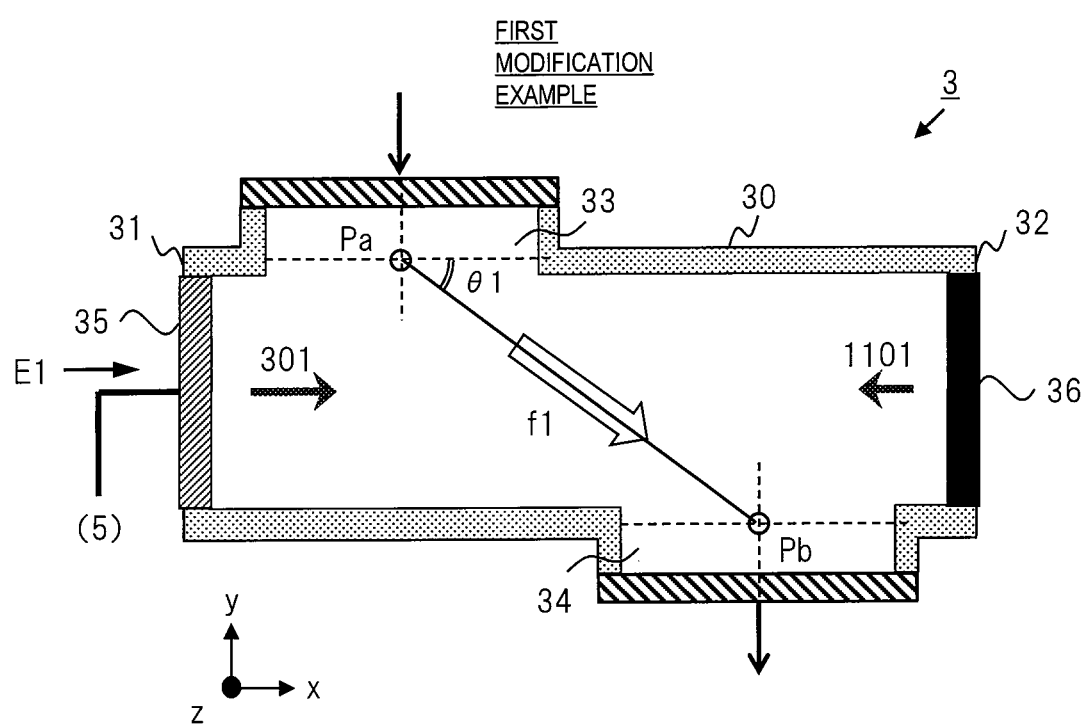
FIG. 11 is a diagram illustrating a configuration of a flow-through separation unit of a suspension flow-through separation apparatus of a first modification example of Embodiment 1 on a xy cross section.

FIG. 11 illustrates a configuration of the flow-through separation unit 3 in a first modification example of Embodiment 1 on a xy cross section. In the configuration of FIG. 11, a first ultrasonic oscillating element 35A is attached to a position of the first planar portion 31 of the cavity structure as a portion that is different from the configuration in FIG. 2 and the like. One plane of the ultrasonic oscillating element 35 is exposed in the channel inside the cavity structure. The ultrasonic waves generated from the ultrasonic oscillating element 35 propagate in the ultrasonic wave propagation direction 301 in the x-direction similar to Embodiment 1.

In addition, in the x-direction, a reflection plate 36 is disposed at a position of the second planar portion 32 facing a side opposite to the ultrasonic oscillating element 35. One plane of the reflection plate 36 is exposed in the channel inside the cavity structure. The ultrasonic waves propagating in the ultrasonic wave propagation direction 301 are reflected by one plane of the reflection plate 36 and propagate back in a direction 1101. The reflection plate 36 can be configured by a material different from a major material of a side surface portion 30 or the like of the cavity structure. As a material of the reflection plate 36, a material having high ultrasonic reflection characteristics is used. The reflection plate 36 may be attached to the outside of the second planar portion 32 and may be attached to the inside of the second planar portion.

As described above, in the first modification example, by the set of the ultrasonic oscillating element 35 and the reflection plate 36, it is easy to form the sound field of the ultrasonic waves. As a result, the separation ability at the flow-through separation unit 3 can be enhanced.

Modification Example (2)

Figure 12:
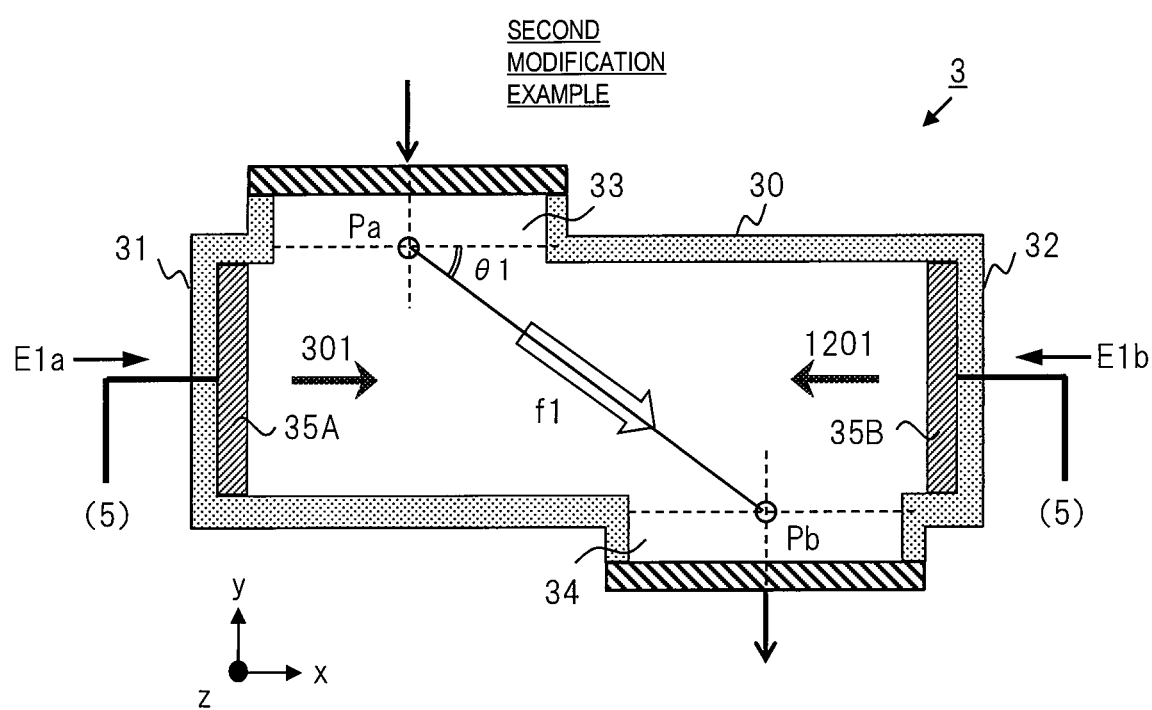
FIG. 12 is a diagram illustrating a configuration of a flow-through separation unit of a suspension flow-through separation apparatus of a second modification example of Embodiment 1 on the xy cross section.

FIG. 12 illustrates a configuration of the flow-through separation unit 3 in a second modification example of Embodiment 1 on the xy cross section. In the configuration of FIG. 12, a first ultrasonic oscillating element 35A is attached to an inner side surface of the first planar portion 31 of the cavity structure as a part that is different from the configuration in FIG. 2 and the like. One plane of the first ultrasonic oscillating element 35A is exposed in the channel inside the cavity structure. In addition, in the x-direction, a second ultrasonic oscillating element 35B is attached to an inner side surface of the second planar portion 32 facing the first planar portion 31 on the opposite side of the first ultrasonic oscillating element 35A. One plane of the second ultrasonic oscillating element 35B is exposed in the channel inside the cavity structure.

From the control unit 5, a first driving signal E1a is supplied to the first ultrasonic oscillating element 35A, and at the same timing, a second driving signal E1b is supplied to the second ultrasonic oscillating element 35B. Accordingly, the ultrasonic waves generated from the first ultrasonic oscillating element 35A propagate in the ultrasonic wave propagation direction 301 in x-direction similar to Embodiment. The ultrasonic waves generated from the second ultrasonic oscillating element 35A propagate in an ultrasonic wave propagation direction 1201 in the opposite direction in x-direction. That is, the ultrasonic waves are emitted from both sides of the channel of the cavity structure in the x-direction, and thus, a sound field is formed.

In this manner, in the second modification example, by a set of the first ultrasonic oscillating element 35A and the second ultrasonic oscillating element 35B, it is easy to form the sound field of the ultrasonic waves. As a result, the separation ability at the flow-through separation unit 3 can be enhanced.

Modification Example (3)

Figure 13:
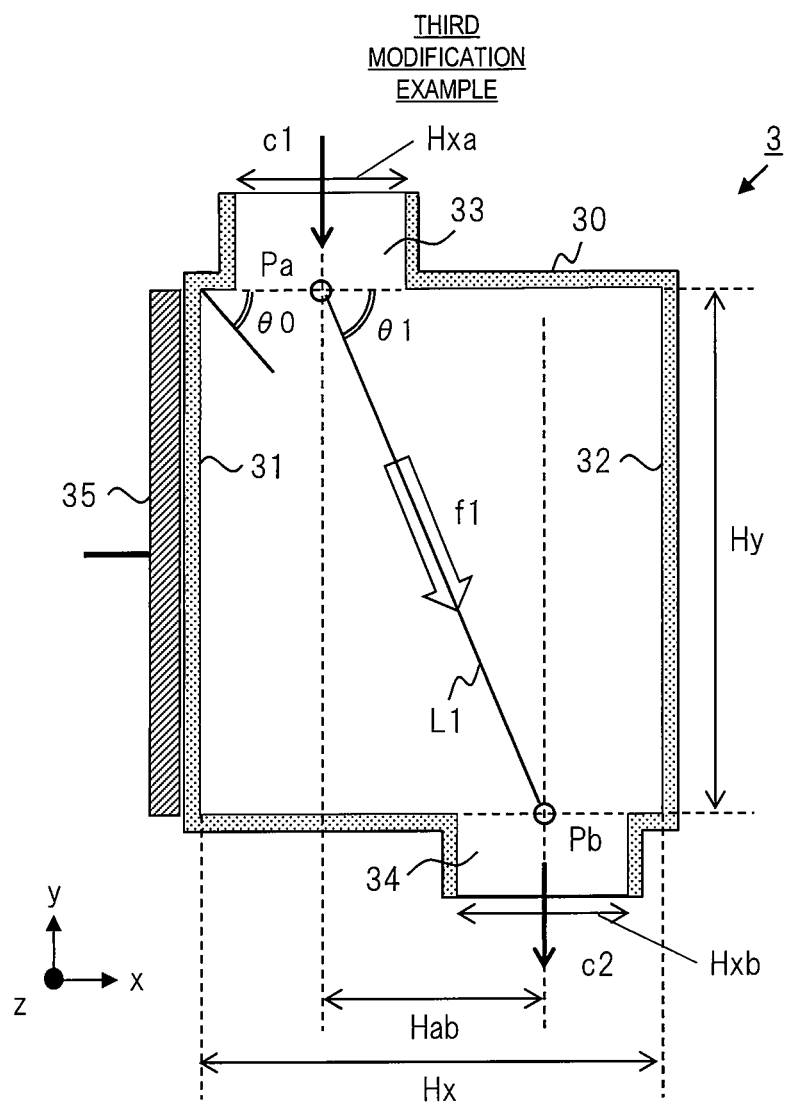
FIG. 13 is a diagram illustrating a configuration of a flow-through separation unit of a suspension flow-through separation apparatus of a third modification example of Embodiment 1 on a xy cross section.

FIG. 13 illustrates a configuration of the flow-through separation unit in a third modification example of Embodiment 1 on a xy cross section. The configuration of FIG. 13 has a configuration in which a width Hy in the y-direction is longer than a width Hx in the x-direction of the cavity structure as a part that is different from the configuration in FIG. 2 and the like. That is, in the third modification example, a condition of Hx<Hy is included as a configuration condition. The condition such as an angle θ1 or a distance Hab is the same as that of Embodiment 1. In the third modification example, an area of the yz plane of the antinode or the node of the ultrasonic waves is larger than those in Embodiment 1. Therefore, the number of the suspended matter that can be captured for each of these planes can be increased.

Embodiment 2

Next, the suspension flow-through separation apparatus or the like of Embodiment 2 of the present invention will be described using FIGS. 14 and 15. The basic configuration of Embodiment 2 is the same as that of Embodiment 1, and hereinafter, the configuration portions in Embodiment 2 different from Embodiment 1 will be described.

[Suspension Flow-Through Separation System]

Figure 14:
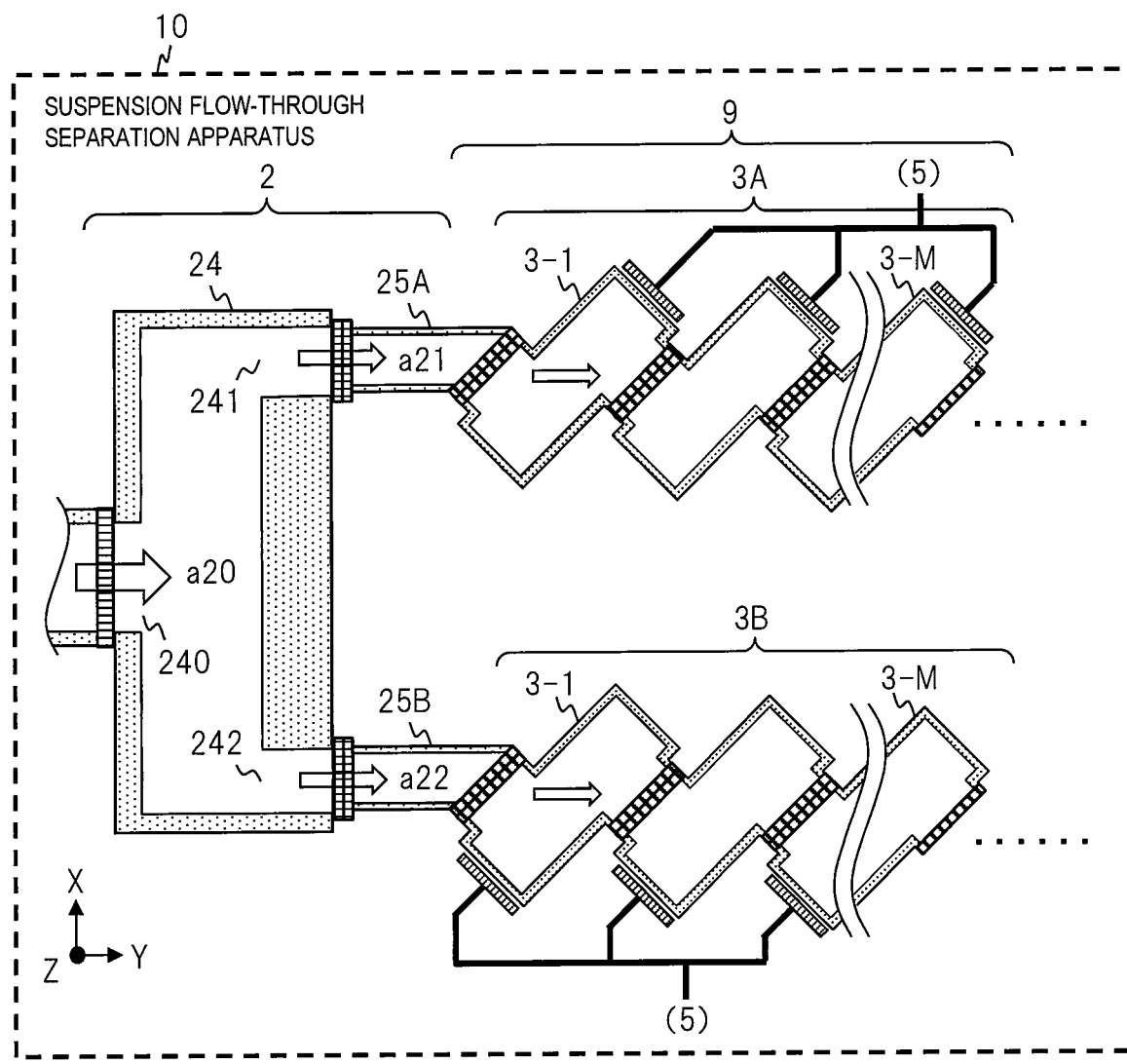
FIG. 14 is a diagram illustrating a configuration of a suspension flow-through separation apparatus of Embodiment 2 of the present invention on the XY plane.

FIG. 14 illustrates a configuration of the suspension flow-through separation apparatus 10 of Embodiment 2 on the XY plane. The suspension flow-through separation apparatus 10 includes the liquid supplying unit 2, the flow-through separator 9, and the discharging unit 4. In the flow-through separator 9, the group of the flow-through separation units 3 is disposed in parallel to the liquid supplying unit 2. The flow-through separator 9 includes a first flow-through separation unit group 3A and a second flow-through separation unit group 3B. The first flow-through separation unit group 3A configures a first flow-through separator, and the second flow-through separation unit group 3B configures a second flow-through separator. The first flow-through separation unit group 3A and the second flow-through separation unit group 3B have the same configuration as the plurality of the flow-through separation units 3 in FIG. 1 of Embodiment 1. For example, in the first flow-through separation unit group 3A, the plurality of the flow-through separation units 3 from the flow-through separation unit 3-1 to the flow-through separation unit 3-M are connected to each other.

Each of the ultrasonic oscillating elements 35 of the first flow-through separation unit group 3A is connected to the control unit 5. Each of the ultrasonic oscillating elements 35 of the second flow-through separation unit group 3B is connected to the control unit 5. The control unit 5 may be provided for each of the parallel flow-through separation unit group, and may be integrated as one control unit 5 as a whole. Each of the ultrasonic oscillating elements 35 of the flow-through separation unit group is driven similar to Embodiment 1.

The liquid supplying unit 2 includes a branching unit 24, a first liquid supply piping 25A, and a second liquid supply piping 25B. The branching unit 24 includes a supply port 240, a first outlet port 241, and a second outlet port 242. The suspension 6 from the flow-through tank 1 flows from the supply port 240. The suspension 6 is branched into a flow a21 to the first outlet port 241 and a flow a22 to the second outlet port 242 by a channel portion branching in the branching unit 24. The first liquid supply piping 25A is connected to the first outlet port 241, and the first liquid supply piping 25A is connected to the flow-through separation unit 3-1 of the first flow-through separation unit group 3A. Similarly, the second liquid supply piping 25B is connected to the second outlet port 242, and the second liquid supply piping 25B is connected to the flow-through separation unit 3-1 of the second flow-through separation unit group 3B.

In Embodiment 2, the flow of the suspension 6 is branched into two flows of a flow where flow-through separation is performed at the first flow-through separation unit group 3A and a flow where the flow-through separation is performed at the second flow-through separation unit group 3B through a branching unit 70 of the liquid supplying unit 2. In each of the flow-through separation unit groups, flow-through separation processing is performed in parallel. Therefore, with respect to Embodiment 1, in Embodiment 2, the same amount of the suspension 6 can be processed in a short time.

In addition, although not illustrated, the discharging unit 4 similar to that of Embodiment 1 is connected to the latter stage of the flow-through separation unit 3-M of each of the flow-through separation unit group. That is, examples of two discharging units 4 include a first discharging unit to be connected to a first flow-through separation unit group 3A and a second discharging unit to be connected to the second flow-through separation unit group 3B. These discharging units 4 may be configured as one discharging unit including a unit for joining branches.

In Embodiment 2, the parallel number of the flow-through separation unit group of the flow-through separator 9 is set to two, but it may be three or more. The parallel number of the flow-through separation unit group can be adjusted by increasing and decreasing the parallel number according to the separation ability required for the system.

[Effect or the Like]

As described above, according to the suspension flow-through separation apparatus 10 or the like of Embodiment 2, the high separation ability capable of separation of the suspended matter in the suspension with a high efficiency can be realized. In addition, according to Embodiment 2, even in a case where the flow-through unit 3 of a part of the flow-through separation unit group is failed among the plurality of the flow-through separation unit group which configures the flow-through separator 9, it is possible to continue operation without stopping the liquid separation process in another flow-through separation unit group. In the continuous operation state, repair or replacement of the flow-through unit 3 such as failure can be performed in the same manner as in Embodiment 1.

Modification examples of the suspension flow-through separation apparatus of Embodiment 2 include the following.

Figure 15:
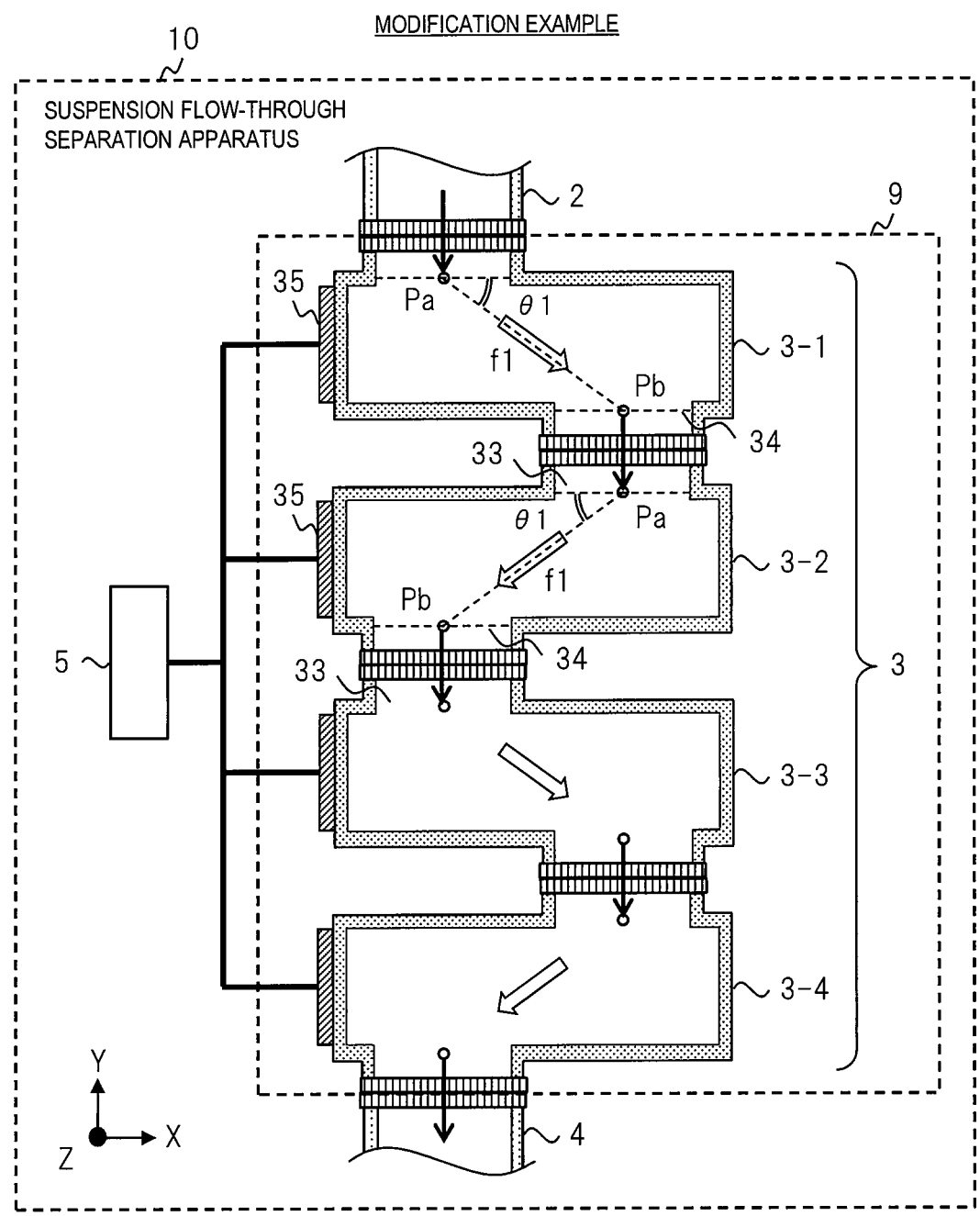
FIG. 15 is a diagram illustrating a configuration of a suspension flow-through separation apparatus of a modification example of Embodiment 2 on the XY plane.

FIG. 15 illustrates a configuration of one flow-through separator 9 in the suspension flow-through separation apparatus 10 of a modification example of Embodiment 2. A configuration in which the flow-through separator 9 is provided in parallel in the same manner as in Embodiment 2 can be adopted. The flow-through separator 9 is configured by the plurality of flow-through separation units 3 having a structure same as that of Embodiment 1, for example, connecting from the flow-through separation unit 3-1 to the flow-through separation unit 3-4. A plurality of the flow-through separation unit 3 having the same shape are connected by alternately changing the orientation of arrangement. For example, the arrangement of the flow-through separation unit 3-1 is the same as that of Embodiment 1, and the supply port 33 is disposed at a left side in the X-direction, and the outlet port 34 is disposed on the right side in the X-direction. The arrangement of the next stage flow-through separation unit 3-2 is that the orientation of the flow-through separation unit 3 is different from that of the flow-through separation unit 3-1, and the supply port 33 is disposed on the right side in the X-direction, and the outlet port 34 is disposed on the left side in the X-direction. The outlet port 34 of the flow-through separation unit 3-1 connected to the supply port 33 of the next stage flow-through separation unit 3-2 through the respective connecting portions.

In the plurality of the flow-through separation unit 3, the positions of the first planar portion 31 and the second planar portion 32 of the flow-through separation unit 3 in the X-direction are aligned. According to this, the entire flow-through separator 9 are in a space region of a schematic rectangular parallelepiped. Therefore, the flow-through separator 9 can be easily disposed in the disposition target space, and space saving can be achieved.

The ultrasonic oscillating elements 35 are provided on one planar portion of the first planar portion 31 and the second planar portion 32 of each flow-through separation unit 3, and these ultrasonic oscillating elements 35 are connected to the control unit 5. In FIG. 15, these ultrasonic oscillating elements 35 are provided so as to be aligned with the planar portion on the left side in the X-direction. However, the ultrasonic oscillating elements 35 may be disposed at the different positions. The overall flow of the suspension 6 in the flow-through separator 9 is a meandering flow.

Embodiment 3

Next, the suspension flow-through separation apparatus or the like of Embodiment 3 of the present invention will be described using FIG. 16. The basic configuration of Embodiment 3 is the same as that of Embodiment 1, and hereinafter, the configuration portions in Embodiment 3 different from Embodiment 1 will be described.

Figure 16:
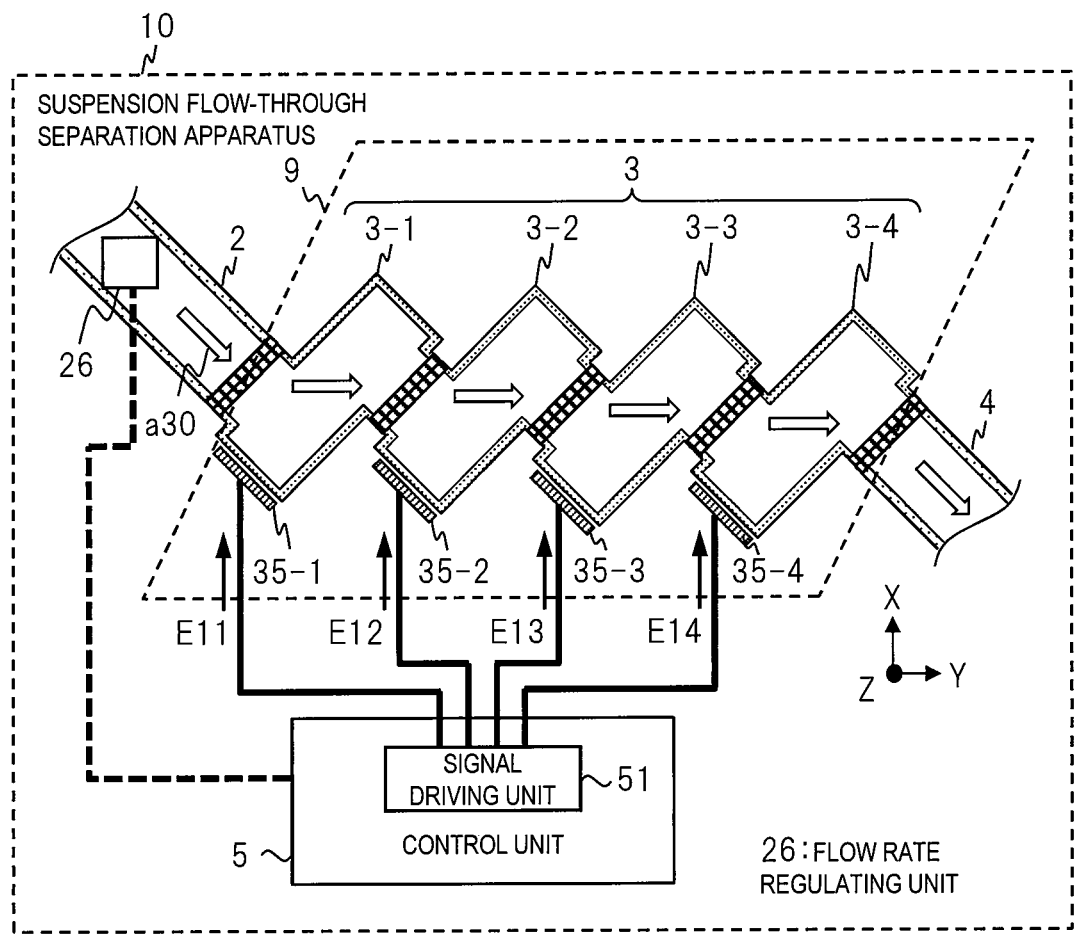
FIG. 16 is a diagram illustrating a configuration of a suspension flow-through separation apparatus of Embodiment 3 of the present invention on the XY plane.

FIG. 16 illustrates a configuration of the suspension flow-through separation apparatus 10 of Embodiment 3 of the present invention on the XY plane. A configuration of the flow-through separator 9 or the like of Embodiment 3 is the same as that of Embodiment 1, and for example, the flow-through separation unit 3-1 to the flow-through separation unit 3-4 are provided. As the ultrasonic oscillating element 35 of respective flow-through separation unit 3, ultrasonic oscillating elements 35-1, 35-2, 35-3, and 35-4 are provided. Each ultrasonic oscillating element 35 is connected to the control unit 5 through each of signal lines.

In Embodiment 3, the control unit 5 drives and controls the ultrasonic oscillating element 35 of each flow-through separation unit 3 independently by individual driving signals E11 to E14. The signal driving unit 51 generates the driving signals E11 to E14. The control unit 5 can drives the plurality of the ultrasonic oscillating elements 35 at a different timing. In addition, the control unit 5 can drives the plurality of the ultrasonic oscillating element 35 by the driving signals E11 to E14 having the different voltages or the like.

In Embodiment 3, it is considered that the flow-through separation of the suspension 6 progresses as the flow-through separation unit 3 in the subsequent stage of the flow in the flow-through separator 9. As a control example, the control unit 5 makes the electric signal for generating the ultrasonic waves to being stronger as much as the flow-through separation unit 3 in the previous stage which is closer to the liquid supplying unit 2 side, and makes the electric signal to being weaker as much as the subsequent stage flow-through separation unit 3 which is closer to the discharging unit 4 side. Accordingly, the flow-through separation ability of the flow-through separator 9 can be optimized.

In addition, in Embodiment 3, a flow rate regulating unit 26 is provided in the liquid supplying unit 2. The flow rate regulating unit 26 has a function of detecting and regulating the flow rate relating to a flow a30 of the suspension 6 to be supplied from the liquid supplying unit 2 to the flow-through separation unit 3-1. The flow rate regulating unit 26 can be configured by, for example, a flow rate sensor, a pump, or the like. The control unit 5 performs control in cooperation with the flow rate regulating unit 26. The control unit 5 performs, for example, an instruction to the flow rate regulating unit 26 such that the flow rate of the flow a30 becomes a flow rate suitable for the flow-through separation at the flow-through separator 9. The flow rate regulating unit 26 regulates a flow rate of the flow a30 according to the instruction.

In addition, the control unit 5 acquires, for example, a flow rate value detected by the flow rate regulating unit 26, and regulates voltage values or the like of the driving signals E11 to E14 to be supplied to the ultrasonic oscillating element 35 of each of the flow-through separation units 3 according to the flow rate value.

[Effect or the Like]

As described above, according to the suspension flow-through separation apparatus 10 or the like of Embodiment 3, the high separation ability capable of separation of the suspended matter in the suspension with a high efficiency can be realized. In addition, according to Embodiment 3, since the ultrasonic oscillating element 35 of each of the flow-through separation units 3 can be independently controlled, more detail control can be performed, whereby obtaining an increase in the separation ability.

The suspension flow-through separation apparatus 10 according to a modification example of Embodiment 3 includes the following. Each of the flow-through separation unit 3 may be provided with a flow rate sensor or the like. The control unit 5 acquires the flow rate value detected by the flow rate sensor, and may control such as adjusting the driving signals E11 to E14 to each of the flow-through separation unit 3 based on the flow rate value.

In the foregoing, the invention made by the inventors of the present invention has been concretely described based on the embodiments. However, it is needless to say that the present invention is not limited to the foregoing embodiments and various modifications and alterations can be made within the scope of the present invention. The present invention can be applied to the liquid including oil waste such as an emulsion or the like.

REFERENCE SIGNS LIST

1: flow-through tank
2: liquid supplying unit
3, 3-1, 3-2, 3-3, 3-M: flow-through separation unit
4: discharging unit
5: control unit
6: suspension
7: clear liquid discharging unit
8: concentrated liquid discharging unit
9: flow-through separator
35: ultrasonic oscillating element
38: connecting portion
51: signal driving unit

The invention claimed is:

1. A suspension flow-through separation apparatus for separating a suspended matter in a suspension while flowing through the suspension, the apparatus comprising:
a flow-through separator that includes a flow-through separation unit,
wherein the flow-through separation unit includes
a cavity structure that functions as a channel through which the suspension flows,
a side surface portion which extends in a first direction of the cavity structure in a horizontal direction,
a supply port which is provided at one first side surface portion of the side surface portion, and through which the suspension is supplied,
an outlet port which is provided at one second side surface portion of the side surface portion, and through which the suspension is discharged,
a first planar portion and a second planar portion that are two planar portions extending in a second direction orthogonal to the first direction of the cavity structure in the horizontal direction, and facing each other, and
an ultrasonic oscillator that is provided at least one of the first planar portion and the second planar portion, and emits ultrasonic waves to the channel based on a driving signal,
wherein the suspended matter in the suspension is captured by the ultrasonic waves and separated in a vertical direction while the suspension flows through the channel of the flow-through separator, and
wherein a first angle formed by the first direction or the second direction and a flow-through direction corresponding to a straight line connecting a center point of the supply port and a center point of the outlet port is an acute angle;
an ultrasonic oscillating element that configures the ultrasonic oscillator and is provided on the first planar portion; and
a reflection plate that reflects the ultrasonic waves on the second planar portion.

2. The suspension flow-through separation apparatus according to claim 1,
wherein the flow-through separator is configured by connecting a plurality of the flow-through separation units to each other.

3. The suspension flow-through separation apparatus according to claim 1,
wherein the first angle formed by a propagation direction of the ultrasonic wave generated in the channel and the straight line in the flow-through direction is the acute angle, and
wherein the straight line flows through a plurality of nodes and antinodes of the ultrasonic wave in the propagation direction.

4. The suspension flow-through separation apparatus according to claim 1,
wherein a predetermined distance is provided between a first position of the center point of the supply port and a second position of the center point of the outlet port in the first direction.

5. The suspension flow-through separation apparatus according to claim 1,
wherein a width of the side surface portion in the first direction is longer than a width of the two planar portions in the second direction.

6. The suspension flow-through separation apparatus according to claim 1,
wherein the width of the side surface portion in the first direction is shorter than the width of the two planar portions in the second direction.

7. The suspension flow-through separation apparatus according to claim 1, further comprising:
a liquid supplying unit that supplies the suspension to the flow-through separator; and
a discharging unit that discharges the suspension, from which the suspended matter is separated in the vertical direction and which is discharged from the flow-through separator, as a clear liquid and a concentrated liquid separately.

8. The suspension flow-through separation apparatus according to claim 1,
wherein in the flow-through separator, a plurality of the flow-through separation units are disposed in a stair shape.

9. The suspension flow-through separation apparatus according to claim 1, further comprising:
a liquid supplying unit that divides a flow of the suspension to a plurality of flows and supplies the diverted suspension to the flow-through separator,
wherein the flow-through separator includes a plurality of flow-through separation unit groups connected in parallel to the liquid supplying unit.

10. The suspension flow-through separation apparatus according to claim 1,
wherein the flow-through separator is disposed such that a plurality of the flow-through separation units changes the directions different from each other to fall in a rectangular parallelepiped region.

11. The suspension flow-through separation apparatus according to claim 1,
wherein the flow-through separator includes a plurality of the flow-through separation units,
wherein the ultrasonic oscillator of each of the plurality of flow-through separation units includes an ultrasonic oscillating element connected to a control unit, and
wherein the control unit supplies the same driving signal to each of a plurality of the ultrasonic oscillating elements and simultaneously drives the ultrasonic oscillating elements.

12. The suspension flow-through separation apparatus according to claim 1,
wherein the flow-through separator includes a plurality of the flow-through separation units,
wherein the ultrasonic oscillator of each of the plurality of flow-through separation units includes an ultrasonic oscillating element connected to a control unit, and
wherein the control unit supplies the different driving signal to each of a plurality of the ultrasonic oscillating elements and independently drives the ultrasonic oscillating elements.

13. A suspension flow-through separation system for separating a suspended matter in a suspension while flowing through the suspension, the system comprising:
a flow-through separator that includes a plurality of flow-through separation units connected to each other;
a tank in which the suspension is stored;
a liquid supplying unit that supplies the suspension from the tank to the flow-through separator;
a discharging unit that discharges the suspension, from which the suspended matter is separated in the vertical direction and which is discharged from the flow-through separator, as a clear liquid and a concentrated liquid independently;
a clear liquid discharging unit that discharges or stores the clear liquid discharged from the discharging unit; and
a concentrated liquid discharging unit that discharges or stores the concentrated liquid discharged from the discharging unit,
wherein the flow-through separation unit includes
a cavity structure that functions as a channel through which the suspension flows,
a side surface portion which extends in a first direction of the cavity structure in a horizontal direction,
a supply port which is provided at one first side surface portion of the side surface portion, and through which the suspension is supplied,
an outlet port which is provided at one second side surface portion of the side surface portion, and through which the suspension is discharged,
a first planar portion and a second planar portion that are two planar portions extending in a second direction orthogonal to the first direction of the cavity structure in the horizontal direction, and facing each other, and
an ultrasonic oscillator that is provided at least one of the first planar portion and the second planar portion, and emits ultrasonic waves to the channel based on a driving signal,
wherein the suspended matter in the suspension is captured by the ultrasonic waves and separated in a vertical direction while the suspension flows through the channel of the flow-through separator, and
wherein a first angle formed by the first direction or the second direction and a flow-through direction corresponding to a straight line connecting a center point of the supply port and a center point of the outlet port is an acute angle;
an ultrasonic oscillating element that configures the ultrasonic oscillator and is provided on the first planar portion; and
a reflection plate that reflects the ultrasonic waves on the second planar portion.

14. A suspension flow-through separation method in a suspension flow-through separation apparatus for separating a suspended matter in a suspension while flowing through the suspension,
wherein the suspension flow-through separation apparatus includes
a flow-through separator that is configured by connecting a plurality of flow-through separation units to each other,
wherein the flow-through separation unit includes
a cavity structure that functions as a channel through which the suspension flows,
a side surface portion which extends in a first direction of the cavity structure in a horizontal direction,
a supply port which is provided at one first side surface portion of the side surface portion, and through which the suspension is supplied,
an outlet port which is provided at one second side surface portion of the side surface portion, and through which the suspension is discharged,
a first planar portion and a second planar portion that are two planar portions extending in a second direction orthogonal to the first direction of the cavity structure in the horizontal direction, and facing each other, and
an ultrasonic oscillator that is provided at least one of the first planar portion and the second planar portion, and emits ultrasonic waves to the channel based on a driving signal, and
wherein a first angle formed by the first direction or the second direction and a flow-through direction corresponding to a straight line connecting a center point of the supply port and a center point of the outlet port is an acute angle;
an ultrasonic oscillating element that configures the ultrasonic oscillator and is provided on the first planar portion; and
a reflection plate that reflects the ultrasonic waves on the second planar portion,
the method comprising the steps, which are to be performed in the suspension flow-through separation apparatus, of:
supplying the suspension to the flow-through separator;
capturing the suspended matter in the suspension by the ultrasonic waves and separating the suspended matter in the vertical direction while flowing the suspension through the channel of the flow-through separator; and
discharging the suspension, from which the suspended matter is separated in the vertical direction and which is discharged from the flow-through separator, as a clear liquid and a concentrated liquid independently.

* * * * *